(12) United States Patent
Xu et al.

(10) Patent No.: US 11,459,873 B2
(45) Date of Patent: Oct. 4, 2022

(54) GEOMODEL-DRIVEN DYNAMIC WELL PATH OPTIMIZATION

(71) Applicant: Saudi Arabian Oil Company, Dhahran (SA)

(72) Inventors: Chicheng Xu, Houston, TX (US); Shuo Zhang, Houston, TX (US); Jay Vogt, Issaquah, WA (US); Troy W. Thompson, Indialantic, FL (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/004,692

(22) Filed: Aug. 27, 2020

(65) Prior Publication Data

US 2021/0095557 A1 Apr. 1, 2021

Related U.S. Application Data

(60) Provisional application No. 62/909,026, filed on Oct. 1, 2019.

(51) Int. Cl.
*E21B 47/022* (2012.01)
*G06F 17/10* (2006.01)
*G01V 99/00* (2009.01)
*E21B 44/02* (2006.01)

(52) U.S. Cl.
CPC ............ *E21B 47/022* (2013.01); *E21B 44/02* (2013.01); *G01V 99/005* (2013.01); *G06F 17/10* (2013.01)

(58) Field of Classification Search
CPC ........ E21B 47/02; E21B 47/006; E21B 33/00; E21B 7/04; E21B 47/022; E21B 44/00;
(Continued)

(56) References Cited

U.S. PATENT DOCUMENTS

2003/0024738 A1* 2/2003 Schuh ................ E21B 7/04
175/45
2012/0048618 A1 3/2012 Zamanian et al.
(Continued)

FOREIGN PATENT DOCUMENTS

| CN | 102425374 | 7/2014 |
| RU | 2270907 | 2/2006 |
| WO | WO2017197203 | 11/2017 |

OTHER PUBLICATIONS

Sawaryn et al., "A Compendium of Directional Calculations Based on the Minimum Curvature Method." SPE Drilling & Completions 20(1), SPE-84246-PA, Jan. 2005, 24-36, 13 pages.
(Continued)

*Primary Examiner* — Yoshihisa Ishizuka
*Assistant Examiner* — Carter W Ferrell
(74) *Attorney, Agent, or Firm* — Fish & Richardson P.C.

(57) ABSTRACT

Systems and methods of optimizing a new well path using a minimum curvature method are disclosed. An arc of the new well path may include a change in curvature at a point along the length of the arc. The arc of the new well path may be determined by iteratively: selecting a length of a first arc portion of the arc; determining a length of a second arc portion of the arc according to a minimum curvature method; combining the first arc portion and the second arc portion to form an arc; determining a deviation of the arc relative to a planned well trajectory; and selecting the arc with the lowest deviation from the planned well trajectory.

18 Claims, 10 Drawing Sheets

(58) Field of Classification Search
CPC .......... E21B 47/024; E21B 47/09; E21B 7/10;
E21B 47/12; E21B 41/0092; E21B 7/06;
E21B 2200/20; E21B 44/02; E21B
44/005; E21B 45/00; E21B 47/06; E21B
49/003; G06F 17/20; G06F 20/20; G06F
17/10; G06F 17/11; G06F 30/20; G01V
99/005; G01V 1/50
See application file for complete search history.

(56) References Cited

U.S. PATENT DOCUMENTS

2016/0341834 A1* 11/2016 Bartetzko ................ G01V 1/50
2017/0211372 A1* 7/2017 Samuel ................. E21B 47/022
2019/0078427 A1* 3/2019 Gillan ....................... E21B 7/04

OTHER PUBLICATIONS

Thompson et al., "Designing and Validating 2D Reservoir Models." SPE Kingdom of Saudi Arabia ATSE, SPE-188066-MS, Apr. 2017, 13 pages.

Wang et al., "Design and Calculation of Complex Directional-Well Trajectories on the Basis of the Minimum-Curvature Method" SPE Drilling and Completion vol. 34, No. 02, Jun. 2019, 173-188, 16 pages.

PCT International Search Report and Written Opinion in International Application No. PCT/US2020/053,739, dated Nov. 24, 2020, 15 pages.

GCC Examination Report issued in Gulf Cooperation Council Appln. No. 2020-40548, dated Oct. 11, 2021, 4 pages.

* cited by examiner

GEOMODEL-DRIVEN DYNAMIC WELL PATH OPTIMIZATION

CLAIM OF PRIORITY

This application claims priority to U.S. Provisional Application Ser. No. 62/909,026, filed on Oct. 1, 2019, the entire contents of which is incorporated herein by reference.

TECHNICAL FIELD

This disclosure relates to optimizing a well path and, more particularly, to redirecting a well drilling operation to account for more accurate reservoir surface locations.

BACKGROUND

High-angle horizontal well ("HAHZ") drilling is used to optimize oil recovery from thin but laterally extensive reservoir zones or massive shale reservoirs. A trajectory of the HAHZ well trajectory is normally planned before drilling based on the interpreted surface, modeled surfaces, or both. A landing plane on which the HAHZ well is intended to land is normally set as an offset below a predicted top surface of the reservoir zone. The actual top surface of the reservoir zone, though, may be azimuthally lower or higher than the predicted top surface. Identification of the actual top surface and an associated displacement from the predicted top surface is generally recognized after drilling into certain sections of the well.

SUMMARY

An aspect of the present disclosure is directed to a method for determining a new well path that intersects a reservoir of the earth. The new well path may include an arc and a landing portion. The method may include selecting a length of a first arc portion of the arc that extends from a first point having a first direction vector located along a planned well trajectory and an second point having a second direction vector located along the landing portion. The second point may correspond to an entry point of the landing portion. The arc may include a change in curvature occurring at a third point located between the first point and the second point. The method may also include determining a length of a second arc portion of the arc using the Minimum Curvature Method; combining the length of the first arc portion and the length of the second arc portion to determine a total length of the arc; and connecting the first point and the second point with the arc. The arc may conform to the first direction vector at the first point and may conform to the second directional vector at the second point. The method may also include determining a deviation of the arc from the planned well trajectory; iteratively repeating steps to determine lengths of different second arc portions based on different lengths for the first arc portion; selecting an optimized arc having a length that minimizes deviation from the planned well trajectory; and steering a drilling operation in accordance with the optimized arc to form the new well path.

Another aspect of the present disclosure is directed to a computer program product encoded on a non-transitory medium, the product comprising computer readable instructions for causing one or more processors to perform operations to determine a new well path that intersects a reservoir of the earth, the new well path including an arc and a landing portion, the operations including: selecting a length of a first arc portion of the arc that extends from a first point having a first direction vector located along a planned well trajectory and an second point having a second direction vector located along the landing portion, the second point corresponding to an entry point of landing portion, the arc having a change in curvature occurring at a third point located between the first point and the second point; determining, using the Minimum Curvature Method, a length of a second arc portion of the arc; combining the length of the first arc portion and the length of the second arc portion to determine a total length of the arc; connecting first point and the second point with the arc, the arc conforming to the first direction vector at the first point and conforming to the second directional vector at the second point; determining a deviation of the arc from the planned well trajectory; iteratively repeating steps starting from the selecting step to the determining a deviation step; selecting an optimized arc having a length that minimizes deviation from the planned well trajectory; and steering a drilling operation in accordance with the optimized arc to form the new well path.

The aspects may also include one or more of the following features. A position of an actual surface of a reservoir of the earth may be determined. The landing portion of the new well path may be established at a position relative to the actual surface of the reservoir when the actual surface is displaced from a predicted surface of the reservoir by a selected amount. Determining a length of the second arc portion of the arc using the Minimum Curvature Method comprises solving for $S_{32}$, $\phi_3$, and $\theta_3$ in the following equation:

$$p_2 - p_1 = \frac{S_{13}f(\alpha_{13})}{2}\begin{bmatrix} \sin\theta_1\cos\phi_1 + \sin\theta_3\cos\phi_3 \\ \sin\theta_1\sin\phi_1 + \sin\theta_3\sin\phi_3 \\ \cos\theta_1 + \cos\theta_3 \end{bmatrix} + $$
$$\frac{S_{32}f(\alpha_{32})}{2}\begin{bmatrix} \sin\theta_3\cos\phi_3 + \sin\theta_2\cos\phi_2 \\ \sin\theta_3\sin\phi_3 + \sin\theta_2\sin\phi_2 \\ \cos\theta_3 + \cos\theta_2 \end{bmatrix}$$

where $p_1$ is the position of the first point; $p_2$ is the position of the second point; $S_{13}$ is the length of the first arc portion of the arc; $S_{32}$ is the length of the second arc portion of the arc; $\phi_1$ is a first directional angle of the direction vector at the first point; $\theta_1$ is a second direction angle of the direction vector at the first point; $\phi_2$ is a first directional angle of the direction vector at the second point; $\theta_2$ is a second direction angle of the direction vector at the second point; $\phi_3$ is a first directional angle of the direction vector at the third point; $\theta_3$ is a second direction angle of the direction vector at the third point; $\alpha_{13}$ is a subtended angle between the direction vector of the first point and a direction vector of the third point; and $\alpha_{32}$ is a subtended angle between the direction vector of the third point and the direction vector of the second point. The function $f(\alpha)$ is a function represented by $$f(\alpha) = \tan\left(\frac{\alpha}{2}\right)/(\alpha)$$

when a subtended angle between two direction vectors is greater than or equal to 0.02 radians, and the function $f(\alpha)$ is a function represented by:

$$f(\alpha) \approx 1 + \frac{\alpha^2}{12}\left\{1 + \frac{\alpha^2}{10}\left[1 + \frac{\alpha^2}{168}\left(1 + \frac{31\alpha^2}{18}\right)\right]\right\}$$

when the subtended angle between two direction vectors is less than 0.02 radians. Combining the length of the first arc portion and the length of the second arc portion to determine a total length of the arc may include combining $S_{13}$ and $S_{32}$ to produce the total length of the arc.

Determining a deviation of the arc from the planned well trajectory may include intersecting the arc and the planned well trajectory with a plurality of parallel planes. Each of the parallel planes may be offset from each other. A deviation may be determined for each plane of the plurality of parallel planes. For each plane, a deviation between a first point formed by an intersection of the arc with the plane and a second point formed by an intersection of the planned well trajectory and the plane may be determined. Determining a deviation of the arc from the planned well trajectory may include plotting the arc and the planned well trajectory in three-dimensional space. The plurality of parallel planes may include a first plurality of planes having a first orientation and a second plurality of planes having a second orientation different from the first orientation.

The aspects may also include one or more of the following features. A drilling operation may be commenced according to the planned well trajectory. An actual surface of a reservoir may be detected during the drilling operation. The landing portion of the new well path may be established at a location relative to the actual surface of the reservoir. Detecting an actual surface of the reservoir may include collecting data during the drilling operation. Collecting data during the drilling operation may include collecting real-time logging-while-drilling data. The landing portion may be a portion of the new well path within the reservoir, and the entry point may be a first point of the landing portion. The different lengths for the first arc portion may be changed according to uniform value. The different lengths for the first arc portion may be changed according to a non-uniform value.

The details of one or more implementations of the present disclosure are set forth in the accompanying drawings and the description that follows. Other features, objects, and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
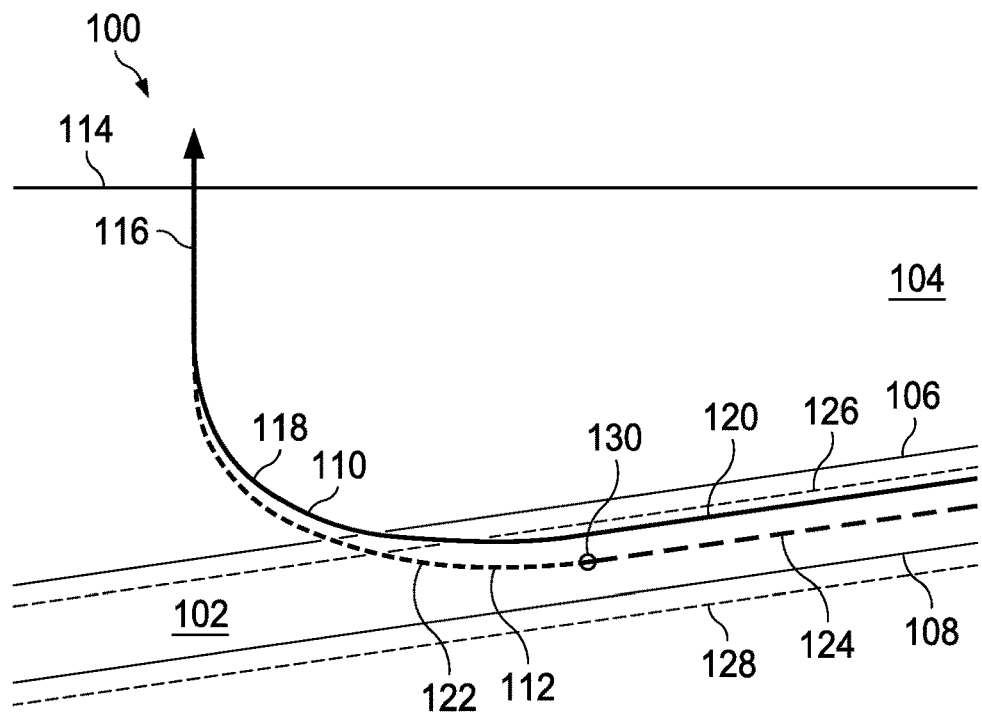
FIG. 1 is an example high-angle horizontal well drilling operation.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, or steps described with respect to one implementation may be combined with the features, components, or steps described with respect to other implementations of the present disclosure.

The present disclosure is directed to systems and methods of optimizing a well path during a drilling operation. For example, the systems and methods are applicable to optimizing a well path dynamically during a high-angle horizontal well ("HAHZ") drilling operation. This disclosure includes optimizing an HAHZ well trajectory from a drill bit to connect a new landing plane within selected engineering constraints according to an up-to-date geological model. The disclosure encompasses altering a route of a directional drilling operation in response to logging data, such as logging data obtained during the drilling operation. The data may be logging-while-drilling data.

FIG. 1 illustrates an example HAHZ drilling operation 100. FIG. 1 shows a cross-section of a portion of the earth that includes a reservoir zone 102 and an overburden 104. The reservoir zone 102 has a first predicted surface 106 and a second predicted surface 108. The first and second predicted surfaces 106 and 108 define boundaries of the reservoir zone 102 with respect to adjacent formations or zones. FIG. 1 also shows an original or planned well trajectory 110 and a modified well trajectory 112. The planned well trajectory 110 extends from a surface 114 of the earth and includes an azimuth portion 116, a planned articulated portion 118, and a planned landing portion 120. The planned landing portion 120 is a landing plane within the understanding of an HAHZ drilling operation. The planned landing portion 120 defines a path within the reservoir zone 102 at a desired position relative to one or more of the predicted surfaces 106 and 108. For this example, the azimuth portion 116 for the planned well trajectory 110 and the modified well trajectory 112 is the same. The modified well trajectory 112 includes a modified articulated portion 122 and a modified landing portion 124. The modified landing portion 124 is a landing plane within the understanding of an HAHZ drilling operation. In this example, the modified articulated portion 122 and the modified landing portion 124 represent a new well path that extends from the original well path. The modified articulated portion 122 and the modified landing portion 124 are joined at a target entry location 130. The target entry location 130 is a location in the reservoir zone where a new well path intersects a new landing plane or profile within the reservoir. In this example, the new well path corresponds to the modified articulated portion 122, and the new landing plane or profile corresponds to the modified landing portion 124. The modified articulated portion 122 is shown extending from the azimuth portion 116. While both the planned articulated portion 118 and the modified articulated portion 122 extend from the same azimuth portion 116, in other instances, the modified articulated portion 122 may extend from a point along the planned articulated portion 118.

In the course of drilling the planned well trajectory 110, the predicted surface 106 is found to be vertically above or more uphole than a first actual surface 126. Similarly, the second predicted surface 108 is more uphole than a second actual surface 128. Although the illustrated example shows the actual surfaces as being vertically above, or more uphole, than the planned surfaces, the scope of the disclosure is not so limited. Rather, the present disclosure encompasses situations in which one or both of the actual surfaces defining a reservoir is below or more downhole than the corresponding predicted surfaces. Further, the disclosure encompasses situations in which one of the predicted first or second surfaces is above the corresponding actual first or second surfaces, while the other of the predicted first or second surfaces is below or more downhole than the corresponding actual first or second surfaces.

As shown in FIG. 1, the planned landing portion 120 of the planned well trajectory 110 is on a plane or surface that is parallel to or aligned with the first predicted surface 106 but offset from the first predicted surface 106. For example, in some implementations, the planned landing portion 120 may be offset vertically below or downhole from the first predicted surface 106 by approximately five to ten feet. However, data may be collected during drilling of the planned well trajectory 110. The data may be logging-while-drilling measurements taken during the course of drilling the planned well trajectory 110. The collected data may be used to determine a position of the first actual surface 126, the second actual surface 128, or both. Further, the offset of the planned landing portion 120 from the first predicted surface 106 may be any desired offset.

With the first actual surface 126 determined, a location of the first actual surface 126 relative to the first predicted surface 106 may be determined. Because the first predicted surface 106, the second predicted surface 108, or both, may have been used to define the planned well trajectory 110, the planned well trajectory 110 may require alteration. In the illustrated example, an alteration to the planned well trajectory 110 is determined to be needed. With improved knowledge of the location and extent of the reservoir 102 (such as by knowledge of the first actual surface 126, the second actual surface 128, or both), a trajectory of the planned well trajectory 110 is altered to be that of the modified well trajectory 112. In some instances, the trajectory of the planned well trajectory 110 may be altered starting from a location where drilling had advanced prior to the determination that an alteration to the trajectory was needed.

The modified well trajectory 112 may be selected such that the modified landing portion 124 is offset from the actual first surface 126 by a selected amount. The modified landing portion 124 defines a new path within the reservoir zone 102 at a selected position relative to one or more of the actual surfaces 126 and 128. In the present example, the modified landing portion 124 may be selected to be parallel with and offset five to ten feet from the first actual surface 126. The modified articulated portion 122 (shown in FIG. 1 as a dashed line) is an optimized path for a drill bit that extends from a portion of the planned well trajectory 110 already drilled to the modified landing portion 124 at a selected offset from one or both of the first actual surface 126 and the second actual surface 128. As explained earlier, the modified articulated portion 122 may extend from the azimuth portion 116 or from a location along the planned articulated portion 118.

A current trajectory of well where the modified articulated portion 122 is to begin and the modified landing portion 124 are known information (that is, known trajectories) used to determine this modified articulated portion 122. With the actual first and second surfaces 126 and 128 identified, a position and orientation of the modified landing portion 124 can be defined. As described later, the modified articulated portion 122 is selected to be an optimized solution to connect the known trajectories in three dimensions. Determination of the optimized modified articulated portion 122 may also take into account variations in azimuth, declination, and a depth of the modified landing portion 124 in three dimensions.

A geosteering technique may be used to build and maintain two-dimensional ("2D") structural frameworks while drilling HAHZ wells. The geosteering technique may include near real-time updates to geological surfaces in the subsurface using the data gathered while drilling. Once a new surface, such as the first actual surface 126 or the second actual surface 128, is defined, a landing plane where the actual landing portion 124 is to be located is selected accordingly. Consequently, the planned well trajectory 110 is modified to account for the newly collected geological data.

A minimum curvature method may be used to construct an arc that extends from a point along the original or planned well trajectory to an entry location associated with the modified landing portion within the reservoir. The arc corresponds to the modified articulated portion 122 shown in FIG. 1. The entry location is a point along the modified landing portion where the arc is to intersect the modified landing portion. The minimum curvature method uses (1) a minimum turning point; (2) a minimum well length; and (3) a minimum deviation from the original path in order to optimize the articulated portion of a new well path.

Determining the new well path using the minimum curvature method involves analysis of a system of non-linear equations. Further, theoretical analysis of the system of non-linear equations shows that a single turning point along the arc may be needed to complete the drilling path between two points in three-dimensional ("3D") space. The degrees of freedom increase linearly with the number of turning points, which will make the system of equations overly underdetermined. Therefore, as the number of turning points increases, non-uniqueness and uncertainty of the system of equations also increases, and the ability to obtain a solution with an increasing number of turning points becomes increasingly difficult. Methods described in the present disclosure have been tested and validated with a well drilled in a carbonate field. During testing, the methods were shown to be capable of providing stable answers where a depth of a target plane (that is a targeted plane within a reservoir where a targeted landing portion is to reside) was adjusted by 50 feet. In some implementations, Matlab®, produced by Mathworks® located at 1 Apple Hill Drive, Natick, Mass. 01760-2098, may be used to calculate an optimal well path in real time and provide updates to wellbore trajectory for guiding real-time directional drilling activities.

Figure 2:
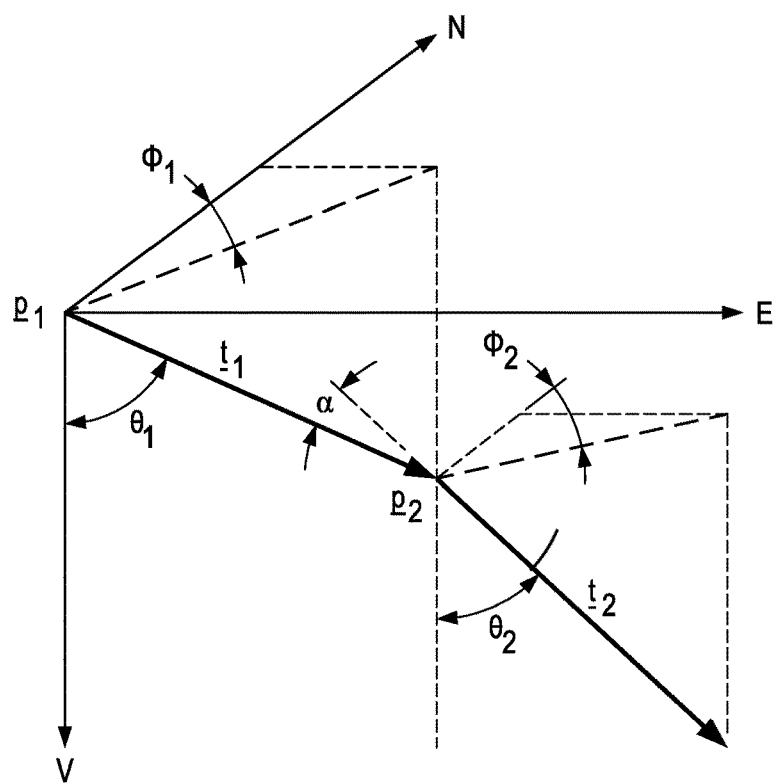
FIG. 2 shows angle components of two direction vectors placed in a head to tail fashion.

The minimum curvature method involves identifying an arc that has a minimum curvature and that links two points, each having a given direction vector, in 3D space. Particularly, the first point is $p_1$ with associated direction vector $t_1$, referred to as $(p_1, t_1)$. The second point is $p_2$, with associated direction vector $t_2$, is referred to as $(p_2, t_2)$. The arc forms a portion of the new well path. FIG. 2 shows the two directional vectors $t_1$ and $t_2$ of points $p_1$ and $p_2$, respectively, placed tip to end. N represents the North direction. E represents the East direction. V represents the vertical direction and is normal to a NE plane. $\phi_1$ is an angle formed by $t_1$ when $t_1$ is projected onto the NE plane. $\theta_1$ is an angle formed by the direction vector $t_1$ when $t_1$ is projected onto the VE plane. $\phi_2$ is an angle formed by $t_2$ when projected onto the NE plane. $\theta_2$ is formed by $t_2$ when $t_2$ is projected onto plane VE, and $\alpha$ is an angle formed between $t_1$ and $t_2$.

Figure 3:
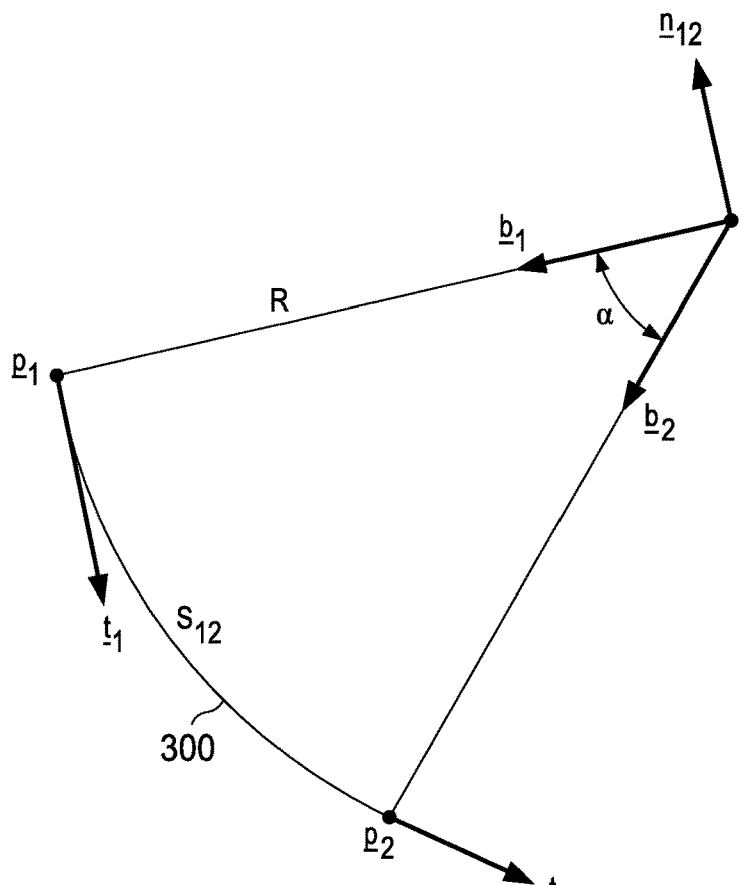
FIG. 3 shows the geometry of the minimum curvature between two adjacent survey points.

FIG. 3 shows the geometry of the minimum curvature between two adjacent survey points $p_1$ and $p_2$, where $S_{12}$ represents a total length of an arc 300 connecting points $p_1$ and $p_2$ and $\alpha$ is the subtended angle between points $p_1$ and $p_2$. R is the radius of the arc 300 joining the points $p_1$ and $p_2$. Binormal vector $n_{12}$ and vectors $b_1$ and $b_2$ at the ends of arc 300 and passing through points $p_1$ and $p_2$, respectively, are determined with the following equations:

$$n_{12} = \frac{t_1 \times t_2}{\sin\alpha} \quad \text{Equation 1}$$

$$b_1 = t_1 \times n_{12} \quad \text{Equation 2}$$

$$b_2 = t_2 \times n_{12} \quad \text{Equation 3}$$

The arc 300 conforms to direction vectors $t_1$ and $t_2$. The arc 300 represents the modified articulated portion of a new well path, which may be similar to the modified articulated portion 122 shown in FIG. 1.

A first equation used to determine the minimum curvature is as follows:

$$\underline{p}_2 = \underline{p}_1 + \frac{S_{12}f(\alpha)}{2}\begin{bmatrix} \sin\theta_1\cos\phi_1 + \sin\theta_2\cos\phi_2 \\ \sin\theta_1\sin\phi_1 + \sin\theta_2\sin\phi_2 \\ \cos\theta_1 + \cos\theta_2 \end{bmatrix} \quad \text{Equation 4}$$

Again, $S_{12}$ represents the total length of an arc connecting points $p_1$ and $p_2$ and $\alpha$ is the subtended angle between points $p_1$ and $p_2$, as shown in FIG. 3. A second equation used to determine the subtended angle $\alpha$ is as follows:

$$\alpha = 2\sin^{-1}\left\{\left[\sin^2\left(\frac{\theta_2-\theta_1}{2}\right) + \sin\theta_1\sin\theta_2\sin^2\left(\frac{\phi_2-\phi_1}{2}\right)\right]^{\frac{1}{2}}\right\} \quad \text{Equation 5}$$

Because the direction angles $\phi$ and $\theta$ associated with points $p_1$ and $p_2$ are known, the angle $\alpha$ is determinable. Once $\alpha$ is determined, the function $f(\alpha)$ is calculated based on the determined angle $\alpha$ according to the following conditions. Where $\alpha$ is greater than or equal to 0.02 radians, the $f(\alpha)$ to be used in the first equation is:

$$f(\alpha) = \tan\left(\frac{\alpha}{2}\right)/(\alpha) \quad \text{Equation 6}$$

Where $\alpha$ is less than 0.02 radians, the $f(\alpha)$ to be used in the first equation is:

$$f(\alpha) \approx 1 + \frac{\alpha^2}{12}\left\{1 + \frac{\alpha^2}{10}\left[1 + \frac{\alpha^2}{168}\left(1 + \frac{31\alpha^2}{18}\right)\right]\right\} \quad \text{Equation 7}$$

The 3D positions, (x, y, z), of points $p_1$ and $p_2$ are known. The direction angles ($\phi$, $\theta$) associated with direction vectors $t_1$ and $t_2$ are also known. Using this information and the condition that the curvature of the arc connecting $p_1$ and $p_2$ is constrained not to include a curvature change, there is only one unknown to be determined from the first equation. That one unknown is the total length $S_{12}$ of arc 300. However, using this constraint (that is, the arc 300 not including a change in curvature), there may not be a solution of an arc to connect the two points $p_1$ and $p_2$ with the given direction vectors $t_1$ and $t_2$. Therefore, an alternative approach may be pursued in which a single curvature change is permitted to occur in the arc 300 connecting the two points $p_1$ and $p_2$.

Figure 4:
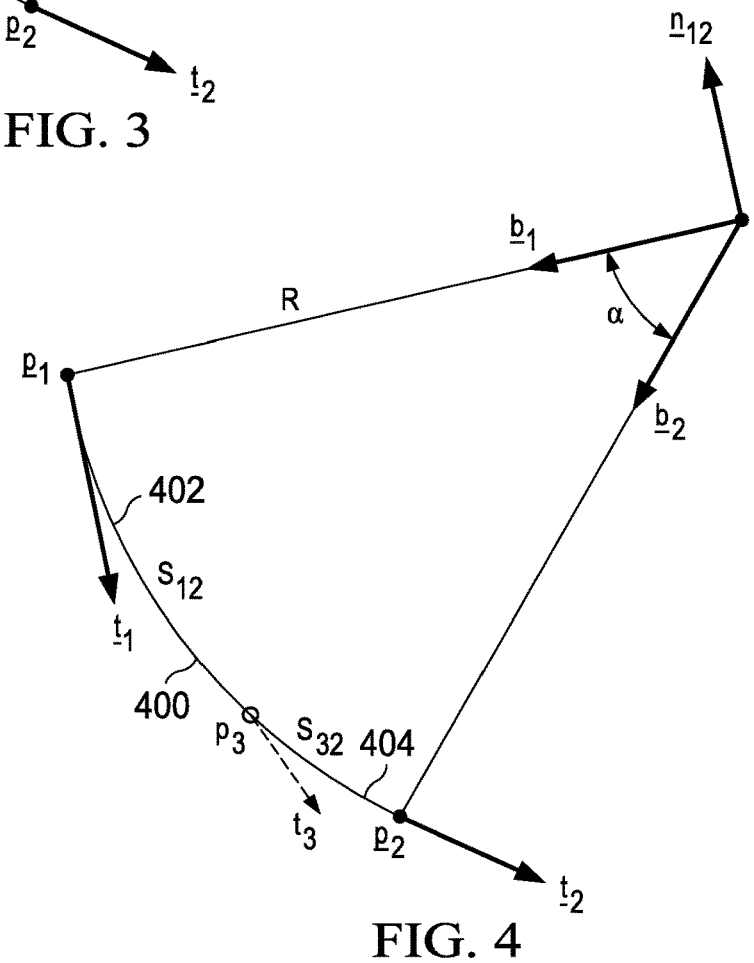
FIG. 4 shows the geometry of a minimum curvature between two adjacent survey points in which the formed arc includes a change in curvature.

FIG. 4 shows an arc 400 similar to arc 300 of FIG. 3 except that arc 400 includes a single curvature change. Arc 400 connects points $p_1$ and $p_2$ and includes a single change in curvature at point $p_3$. The arc 400 is a composite of a first arc portion 402 and a second arc portion 404. The first arc portion 402 and second arc portion 404 are joined at point $p_3$. The first arc portion 402 has an arc length of $S_{13}$, and the second arc portion 404 has an arc length of $S_{32}$. The point $p_3$ has an associated direction vector $t_3$.

If the arc 400 is allowed to have a single curvature change, such as at point $p_3$, a total of seven unknowns, that is ($S_{13}$, $S_{32}$), ($x_3$, $y_3$, $z_3$), ($\phi_3$, $\theta_3$), results. As explained earlier, $S_{13}$ is the arc length of the first arc portion 402; $S_{32}$ is the arc length of the second arc portion 404; $x_3$, $y_3$, and $z_3$ are the coordinates of point $p_3$ in space; and the direction angles $\phi_3$ and $\theta_3$ are the respective horizontal and vertical angles of the direction vector $t_3$ that is associated with point $p_3$. The direction angles $\phi_3$ and $\theta_3$ are arranged similarly to those described earlier with respect to $t_1$ and $t_2$. However, the system of equations for this condition contains six equations. As a result, the system of equations is underdetermined. Consequently, multiple solutions are possible. By fixing the length of the first arc $S_{13}$, the equation system becomes exactly determined, which means there will be a unique solution for the remaining six unknowns. If additional turning points in the arc 400 were permitted, the degrees of freedom will increase linearly with the number of additional turning points. As a result, the system of equations becomes highly underdetermined, and non-uniqueness and uncertainty increases.

A single change in curvature of arc 400 is now examined. The equations used to solve for $S_{13}$ and $S_{32}$ are the same as those described earlier. For a given point $p_i$, the location of point $p_i$ (i=1, 2, 3) is ($x_i$, $y_i$, $z_i$). The direction vector associated with $p_i$ is $t_i$, and the direction angles for $t_i$ are ($\phi_i$, $\theta_i$). For the first arc portion 402 that connects $p_1$ and $p_3$, the equations are:

$$p_3 = p_1 + \frac{S_{13}f(\alpha_{13})}{2}\begin{bmatrix} \sin\theta_1\cos\phi_1 + \sin\theta_3\cos\phi_3 \\ \sin\theta_1\sin\phi_1 + \sin\theta_3\sin\phi_3 \\ \cos\theta_1 + \cos\theta_3 \end{bmatrix} \quad \text{Equation 8}$$

For the second arc portion 404 that connects $p_3$ and $p_2$, the equations are:

$$p_2 = p_3 + \frac{S_{32}f(\alpha_{32})}{2}\begin{bmatrix} \sin\theta_3\cos\phi_3 + \sin\theta_2\cos\phi_2 \\ \sin\theta_3\sin\phi_3 + \sin\theta_2\sin\phi_2 \\ \cos\theta_3 + \cos\theta_2 \end{bmatrix} \quad \text{Equation 9}$$

When the second set of equations are added to the first set of equations, $p_3$ location unknowns are canceled out. The result is:

$$p_2 - p_1 = \frac{S_{13}f(\alpha_{13})}{2}\begin{bmatrix} \sin\theta_1\cos\phi_1 + \sin\theta_3\cos\phi_3 \\ \sin\theta_1\sin\phi_1 + \sin\theta_3\sin\phi_3 \\ \cos\theta_1 + \cos\theta_3 \end{bmatrix} + \quad \text{Equation 10}$$

$$\frac{S_{32}f(\alpha_{32})}{2}\begin{bmatrix} \sin\theta_3\cos\phi_3 + \sin\theta_2\cos\phi_2 \\ \sin\theta_3\sin\phi_3 + \sin\theta_2\sin\phi_2 \\ \cos\theta_3 + \cos\theta_2 \end{bmatrix}$$

When the locations of $p_1$ and $p_2$ and direction vectors $t_1$ and $t_2$ associate with $p_1$ and $p_2$ are known, this is a non-linear system of equations that reduces to three equations with four unknowns: ($S_{13}$, $S_{32}$, $\phi_3$, $\theta_3$). After selecting a value for the arc length $S_{13}$ of the first arc portion 402, the system of equations becomes determined and solvable. For example, in some implementations, the Matlab function *f*solve( ) may be used to solve this system of equations for length $S_{32}$.

While a solution to the system of equations is now achievable, a value for arc length $S_{12}$ is needed. A range of values for $S_{12}$ is possible. Therefore, in selecting the $S_{12}$ value, an optimal length of $S_{12}$ is one that minimizes deviation of the well path from a planned well trajectory, such as the planned well trajectory 110 described earlier.

If different lengths of $S_{12}$ are selected and inputted into this system of equations, a series of solutions for the connecting path represented by arc 400 can be obtained. From this set of solutions, a single solution may be selected. The optimal solution is the one that deviates the well path the least from the planned well trajectory.

Figure 5:
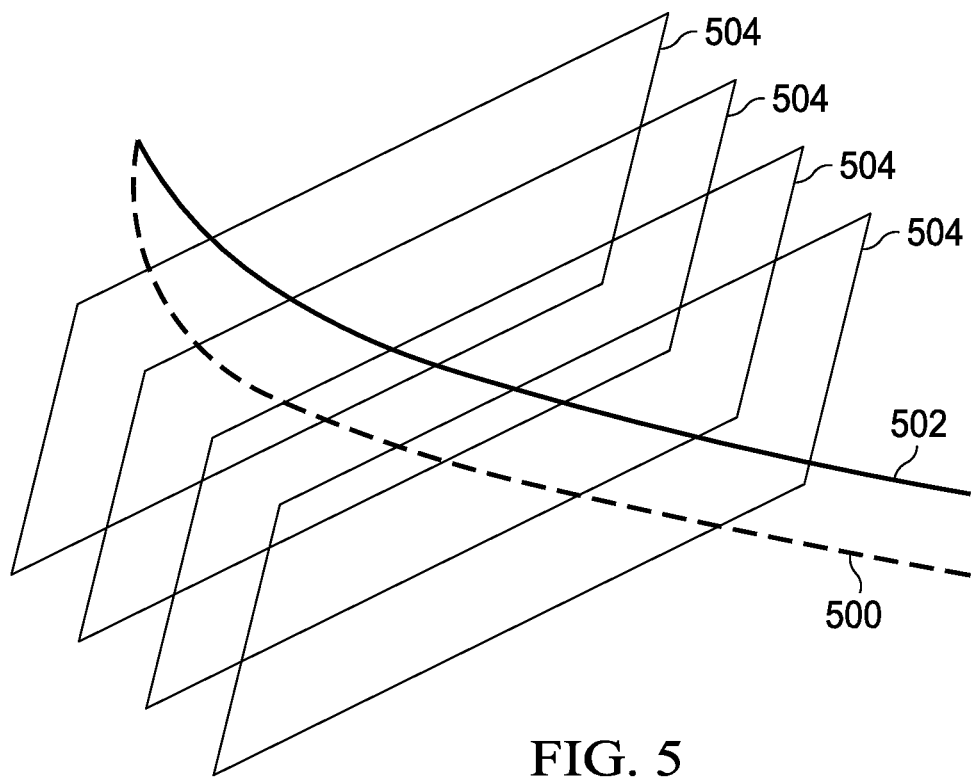
FIG. 5 shows a plurality of planes intersecting a possible well path and a planned well trajectory in order to determine a deviation of the possible well path from the planned well trajectory.
Figure 6:
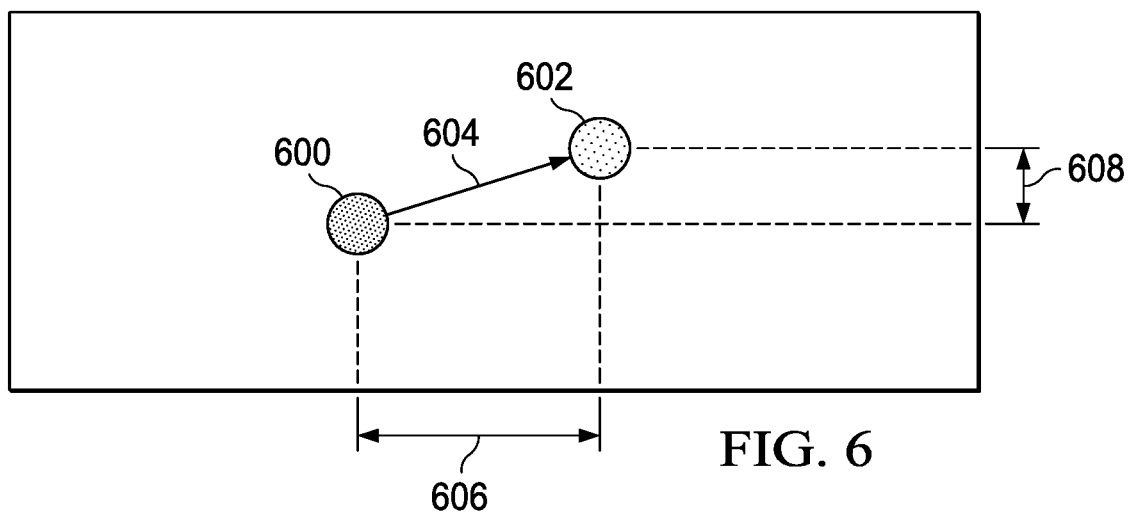
FIG. 6 shows a view normal to a plane intersecting a possible well path and a planned well trajectory in which a deviation between intersections of the possible well path and the plane and the planned well trajectory and the plane is shown.

In some implementations, the deviation may be determined with the use of a series of parallel planes, as shown in FIGS. 5 and 6. For example, a series of parallel planes yz planes that are offset by an offset along the x-axis may be used. For example, a series of parallel yz planes with a constant offset along the x-axis ($\Delta x$) of 10 feet may be used. In other implementations, the offset along the x-axis may not be a constant value but may vary between adjacent parallel planes. In other implementations, parallel xy planes having a constant or varying offset along the z-axis may be used or parallel xz planes having a constant or varying offset along the y-axis may be used. The spacing of the planes may be selected as desired. For example, in some instances, a spacing of 10 feet may be used. However, a spacing greater or less than 10 feet may be used. In still other implementations, different sets of parallel planes, for example a set of xy planes, a set of yz planes, and a set of xz planes or a combination of these may be used. Further, in still other implementations, a set of parallel planes that are oriented relative to a different coordinate system may be used in the deviation determination.

In some implementations, a group of one or more types of these planes, that is, xy planes, yz planes, or xz planes, may be used to determine deviation of the arc of the new well path from an original or planned well trajectory. Where a group of more than one type of these planes is used, the deviation of the arc may be compared with respect to different frames of reference. In other implementations, a group of one or more of these series of these planes may be used. The use of different types of planes allows the deviation of the arc to be analyzed in different ways.

The deviation of the arc of the new well path is determined in each plane by comparing the intersection of the arc with a plane with the intersection of the planned well trajectory with the same plane. This analysis is repeated for each plane of a set of parallel planes along the trajectory of the arc and the planned well trajectory. The deviation for two identical curves is zero. The mathematical equation used to calculate the deviation is:

$$d = \Sigma(\Delta x_i^2 + \Delta y_i^2 + \Delta z_i^2), \quad \text{Equation 11}$$

where d is the deviation, $\Delta x_i$, $\Delta y_i$, $\Delta z_i$ are the differences in the coordinates between the points on the original well path (that is, the planned well trajectory) and the arc of the new well path.

Returning again to FIGS. 5 and 6, FIG. 5 shows an original well path 500 and an arc 502 of a new well path. A series of parallel planes 504 is also shown. Each of the planes 504 intersects both the original well path 500 and the arc 502. FIG. 6 shows a view normal to one of the planes 504 with a point 600 representing an intersection of the original well path 500 and the plane 504 and a point 602 representing an intersection of the arc 502 of the new well path with the plane 504. A deviation 604 is shown. If the plane 504 represented in FIG. 6 was an xy plane, the deviation 604 may be represented by an x-component 606 and a y-component 608. The total deviation is defined as the cumulative offset in the projected planes along the trajectory of the arc.

Redirecting drilling operations from a planned well trajectory to the arc of a new well path typically involves a minor shift. However, a "dogleg severity" or an unrealistic trajectory change over a given drilling distance (that is, a trajectory change that is not possible to create during drilling) should be avoided. A transition from the original well trajectory to the arc of the new well path to a new target entry location should be selected to be smooth. The target entry location is a location where the new well path intersects a new landing plane or profile within the reservoir. The target entry location 130 is shown in FIG. 1.

A location along the original well trajectory where drilling was stopped is used as a default starting point of the modified articulated portion or arc of the new well path. The end of where drilling of the original well trajectory was stopped corresponds to point $p_1$ shown in FIG. 2. The direction vector at this location (which corresponds to direction vector $t_1$ shown in FIG. 2) will remain the same and corresponds to the direction vector of the already drilled path. In this way, the original well trajectory may be used to contain the new well path and, particularly, formation of the arc. The target entry location (which corresponds to point $p_2$ shown in FIG. 2) represents the default ending point of the modified articulated portion of the new well path where the new well path intersects the new modified landing portion of the modified well trajectory. The direction vector at the target entry location (which corresponds to direction vector $t_2$ shown in FIG. 2) is determined by calculating a gradient or directional vector between the default starting point (that is, $p_1$) and the default ending point (that is, $p_2$).

Figure 7:
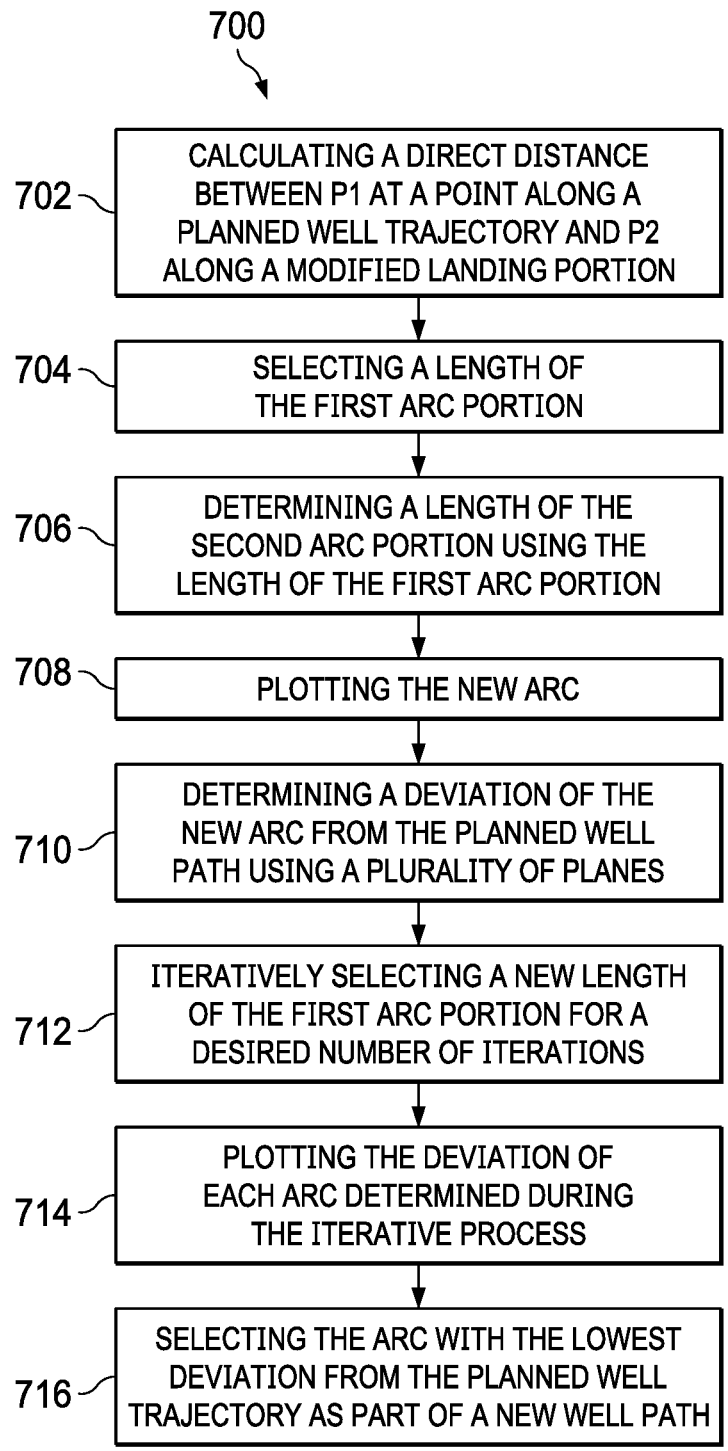
FIG. 7 shows a flowchart of an example method for determining an arc of a new well path.

Selection of the arc of the new well path may be an iterative process. FIG. 7 is a flowchart of an example method 700 of determining a new well path. At 702, a direct distance between $p_1$ at a point along a planned well trajectory and $p_2$ along a modified landing portion is calculated. The $p_1$ may be a location of a drill bit used to form the planned well trajectory where the drilling along the planned well trajectory was stopped. In some implementations, the direct distance between $p_1$ and $p_2$ may be determined as a Euclidian distance between $p_1$ and $p_2$ using three-dimensional geometry. At 704, a length of the first arc portion is selected. At 706, a length of the second arc portion is determine using the length of the first arc portion in the manner described earlier. With the lengths of the first arc portion and the second arc portion determined, a new arc is then plotted at 708. As indicated earlier, in addition to determining $S_{32}$, $\phi_3$ and $\theta_3$ are also determined. Therefore, direction vector $t_3$ is determinable as is $\alpha_{13}$ and $\alpha_{32}$. In some implementations, the plot may be visualized by displaying the plot on a display device. The new arc may be plotted taking into consideration the particular constraints of the system. As discussed earlier, the constraints include the locations and direction vectors (such as, $t_1$, $t_2$, and $t_3$) of the points (such as points $p_1$, $p_2$, and $p_3$) for a particular well drilling operation.

Figure 8:
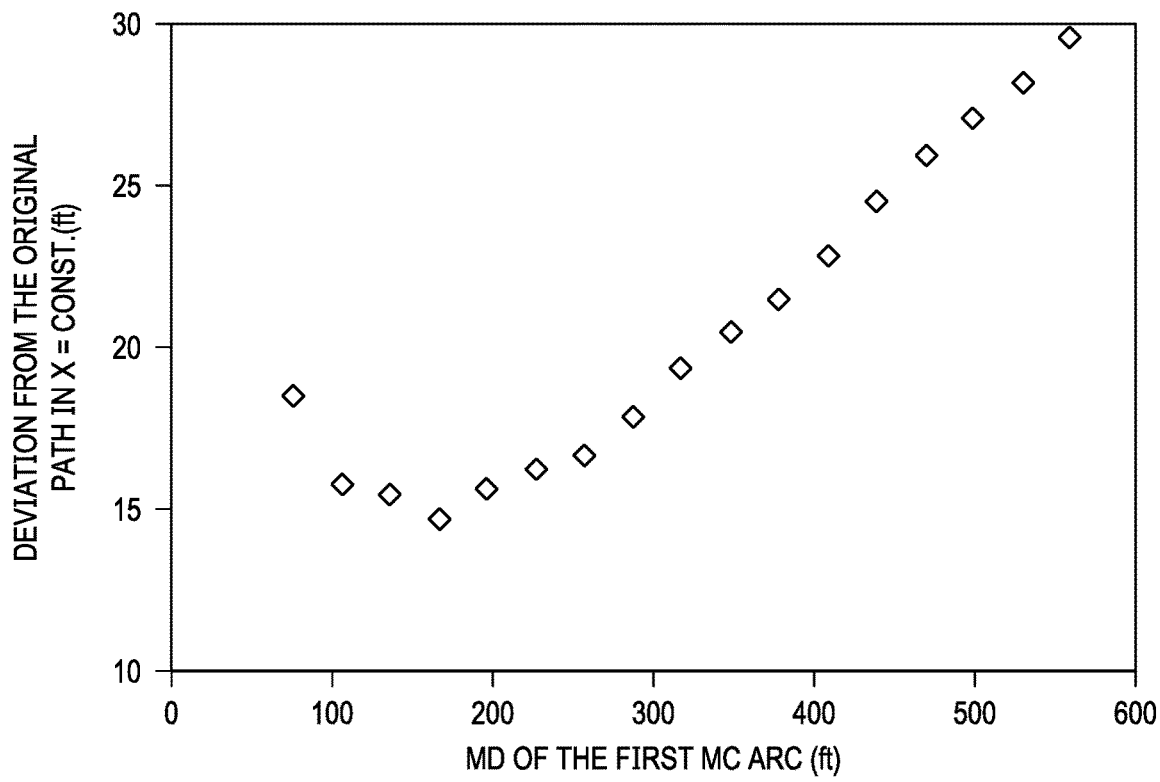
FIG. 8 shows a plot of deviations of potential arcs from a planned well trajectory using planes that are x=constant.
Figure 9:
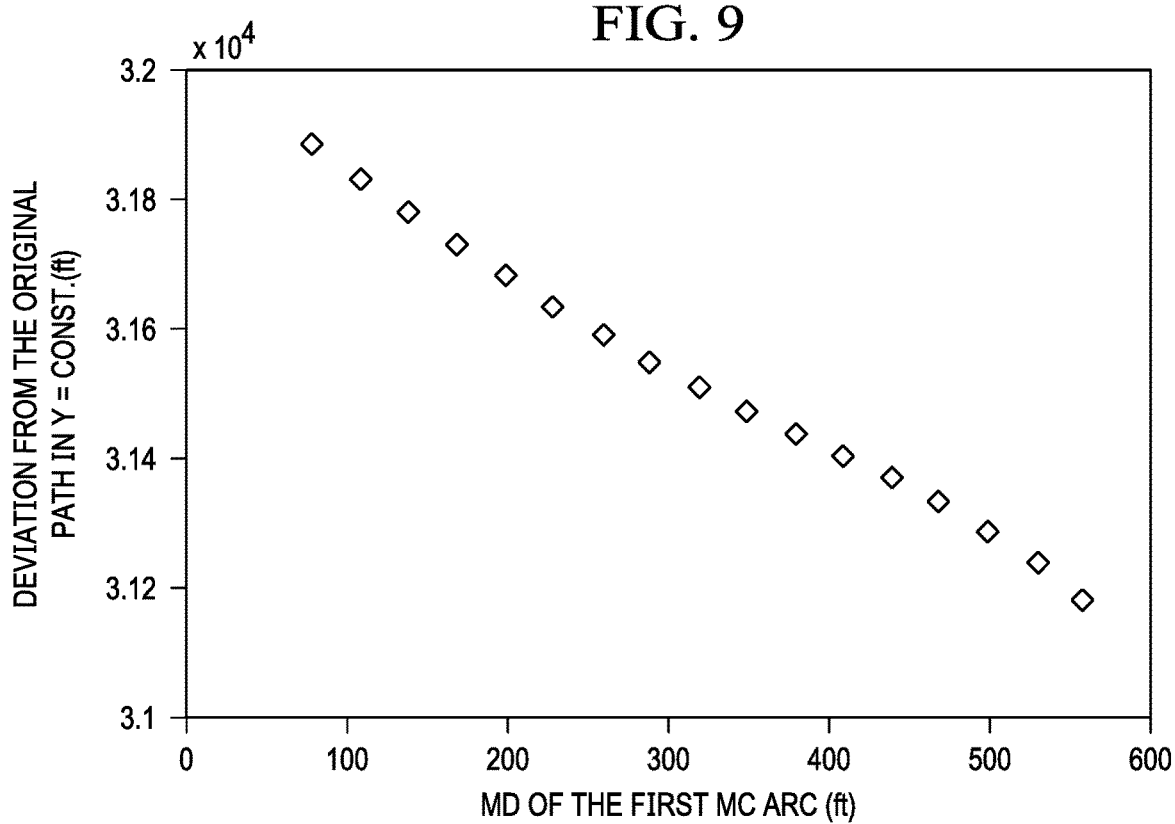
FIG. 9 shows a plot of deviations of potential arcs from a planned well trajectory using planes that are y=constant.
Figure 10:
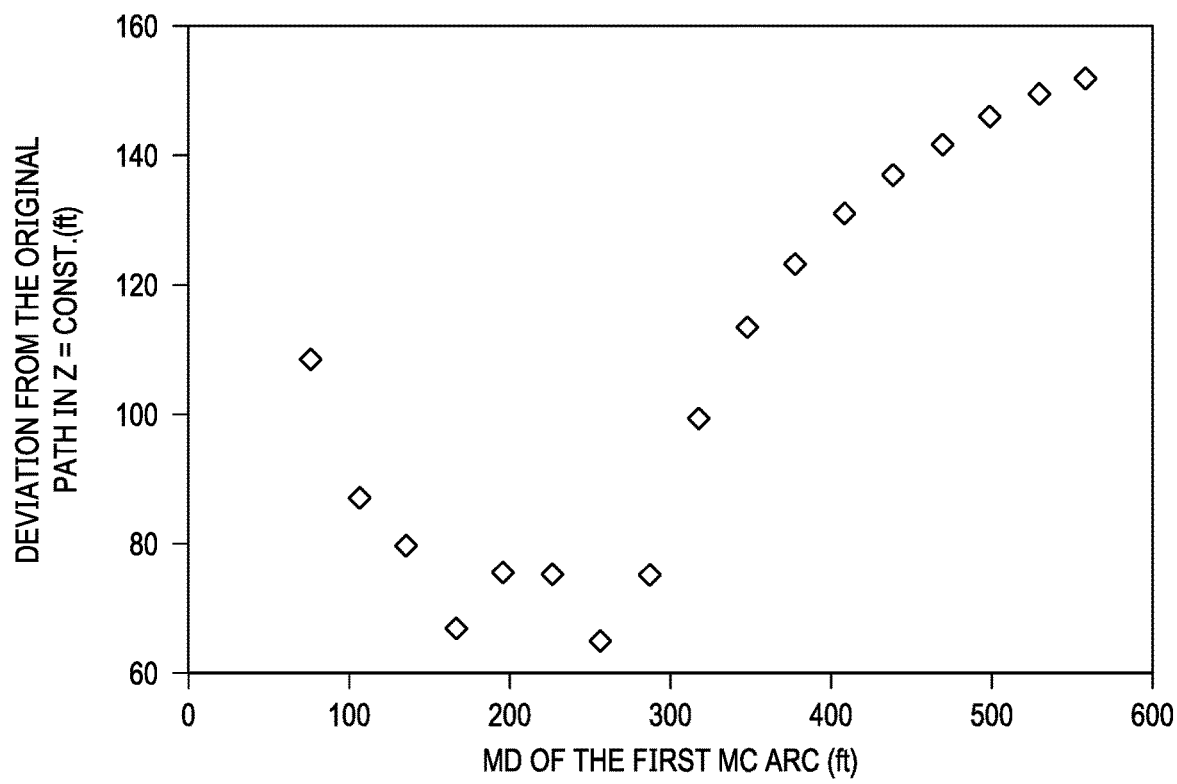
FIG. 10 shows a plot of deviations of potential arcs from a planned well trajectory using planes that are z=constant.
Figure 11:
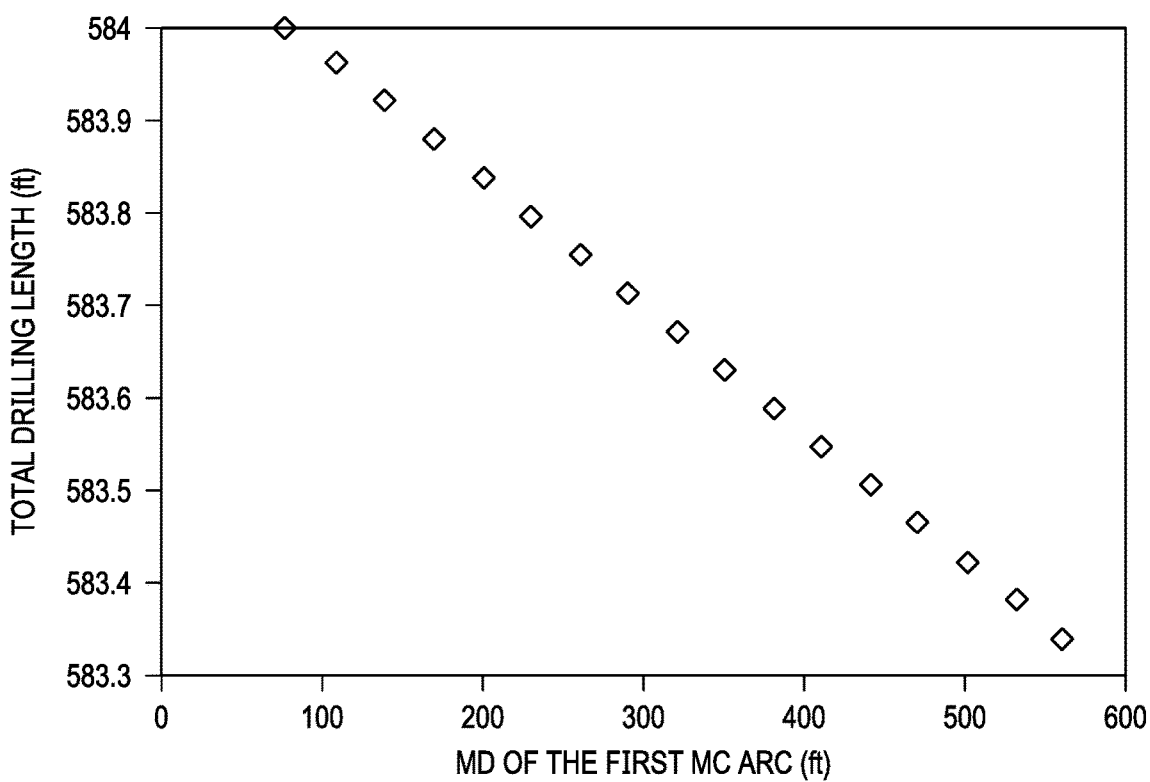
FIG. 11 shows a plot of lengths of first arc portions of an arc versus a total drilling length of a well.

At 710, with the new arc plotted, a deviation of the new arc from the planned well path is determined in the manner described earlier using a plurality of planes. At 712, the process repeats for a selected number of iterations, with the deviation of each produced arc from the planned well trajectory being determined. In some implementations, the selected length of the first arc portion may be incremented (or decremented) in successive iterations by a fixed or uniform value. In other implementations, the selected length of the first arc portion in successive iterations may be incremented (or decremented) with a non-uniform value. In still other implementations, successive iterations of the length of the first arc portion may be altered using a uniform value, while other successive iterations of the length of the first arc portion may be altered using a non-uniform value. When the iterative process is complete, the deviation of each iterative solution is plotted at 714. FIGS. 8, 9, and 10 show these plots of length of the arc versus the deviation from the planned well trajectory. FIG. 8 plots deviation of the generated arc from the original path using a set of parallel yz planes in which adjacent planes are offset by a constant $\Delta x$ amount, as described earlier. FIG. 9 plots deviation of the generated arc from the original path using a set of parallel xz planes in which adjacent planes are offset by a constant $\Delta y$ amount (that is, a uniform offset amount in along the y-axis), and FIG. 10 plots deviation of the generated arc from the original path using a set of parallel xy planes in which adjacent planes are offset by a constant $\Delta z$ amount (that is, a uniform offset amount in along the z-axis). FIG. 11 is a graph showing a length of the first arc portion versus the total arc length for the iteratively determined solutions. Thus, FIG. 11 is a plot of arc length $S_{13}$, as shown in FIG. 4.

At 716, the arc having the lowest deviation from the planned well trajectory is selected. The selected arc forms the new well path between the planned well trajectory and the modified landing portion. In this particular example shown in FIGS. 8-11, the optimal length of the first arc is about 170 feet (ft.) (51.8 meters (m)), which corresponds to a length where both deviations from the original drilling plan in x=constant planes and z=constant planes are at a minimum. This length also corresponds to where the deviation in the y=constant plane changes slowly and a total arc length also changes slowly.

Figure 12A:
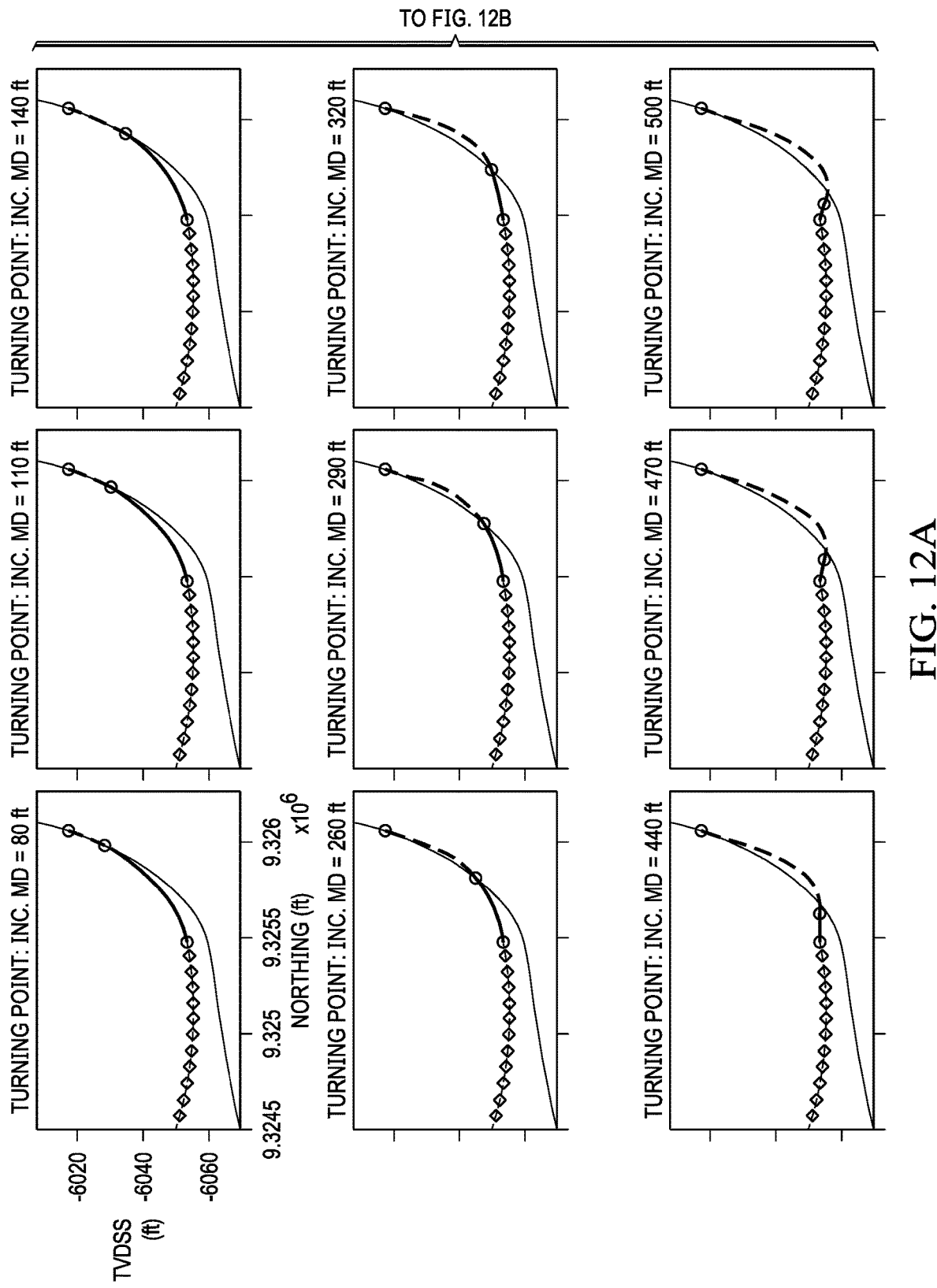
FIGS. 12A and 12B show a plurality of well planning graphs in which each graph is mapped using an arc having a different arc length.
Figure 12B:
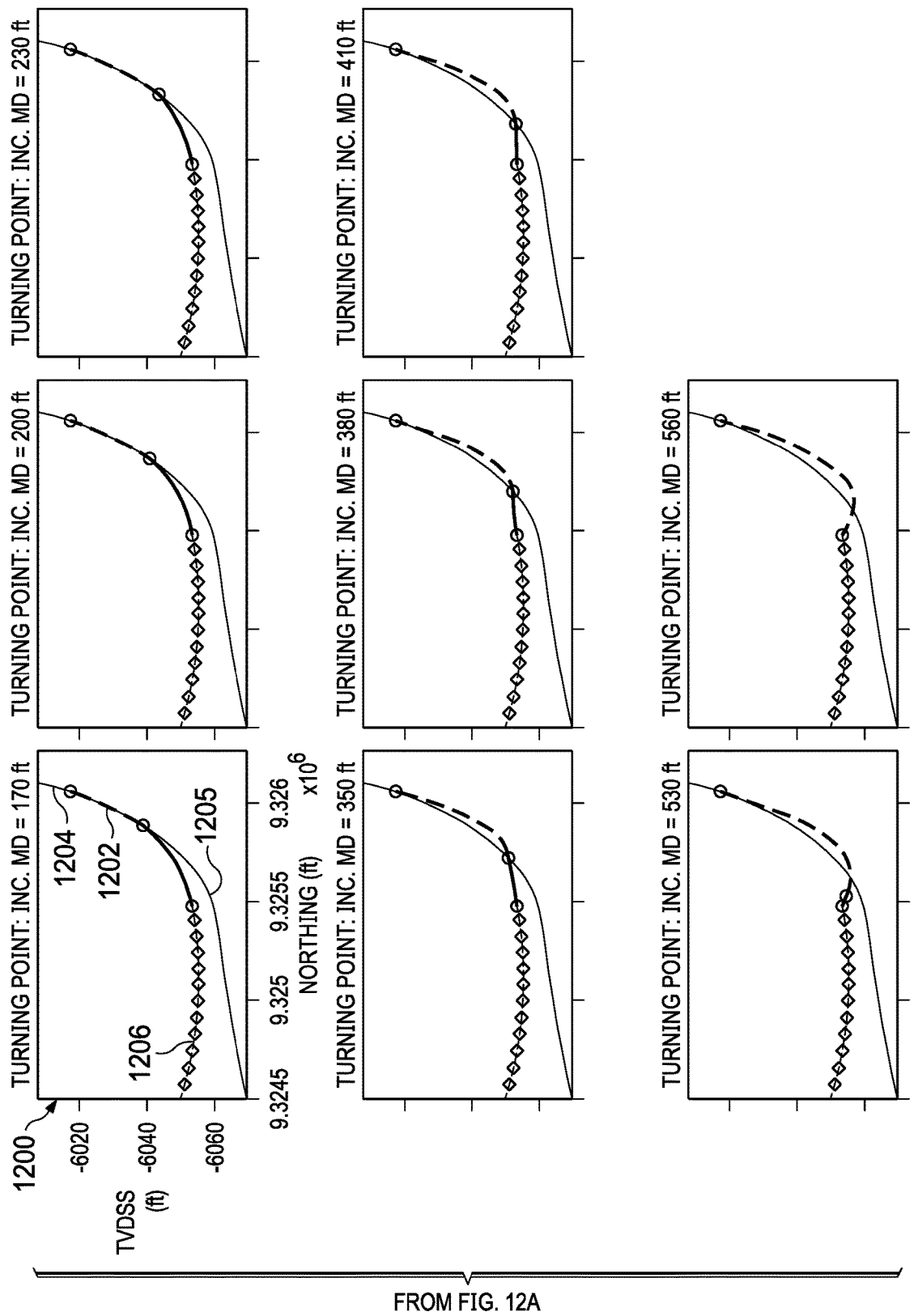

In some implementations, at each iteration, at the conclusion of the iterative process, or both, a plot of the new well path for each determined arc may be produced. FIGS. 12A and 12B show example plots for each arc determined during the iterative process. These plots illustrate how each of the determined arcs fit within the constraints of the system. MD represents the total arc length of the plotted arc solution. Plot 1200 includes an arc 1202 having the length of 170 ft. (51.8 m). The arc 1202 joins a portion 1204 of the planned well trajectory 1205 and a modified landing portion 1206. The arc 1202 is the calculated new path that will change inclination and azimuth after 170 ft. (51.8 m).

Figure 13:
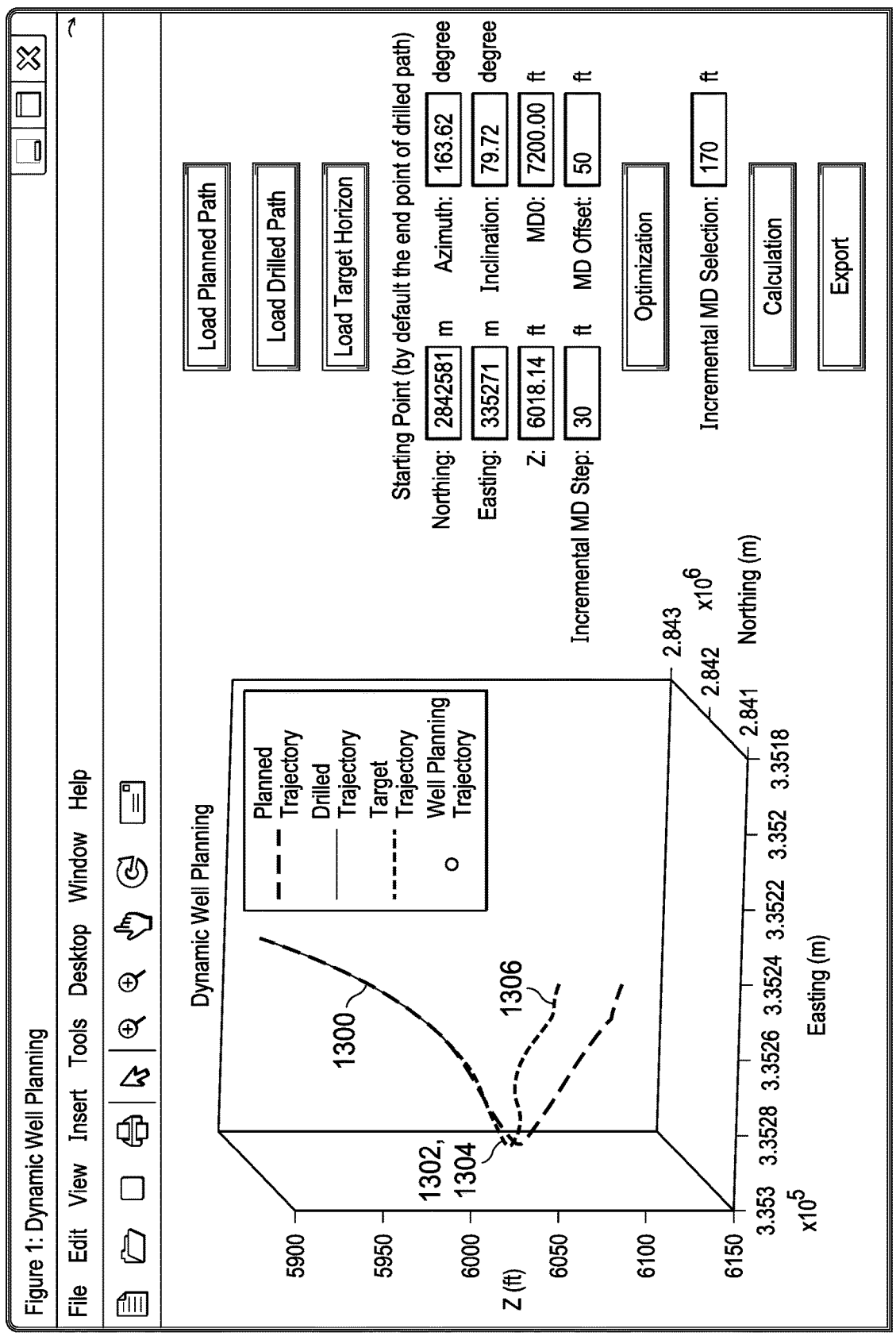
FIG. 13 shows a three-dimensional plot showing a planned well trajectory along with a modified well trajectory.

FIG. 13 is a plot showing a planned well trajectory 1300 and a modified well trajectory 1302 that includes an arc 1304 determined according to the present disclosure. The arc 1304 connects the planned well trajectory 1300 to a modified landing portion 1306. A plot similar to that shown in FIG. 13 may be produced for each iterative arc solution determined.

While determination of a new well path is made in the context of the identification of a more accurate reservoir surface or boundary location, the scope of the disclosure is not so limited. Rather, the method of determining a new well path as disclosed within the present disclosure is applicable to other circumstances. For example, a new landing trajectory within a reservoir may be desired, and the new landing trajectory may be selected without the use of new data that characterizes the reservoir and associated boundaries.

Figure 14:
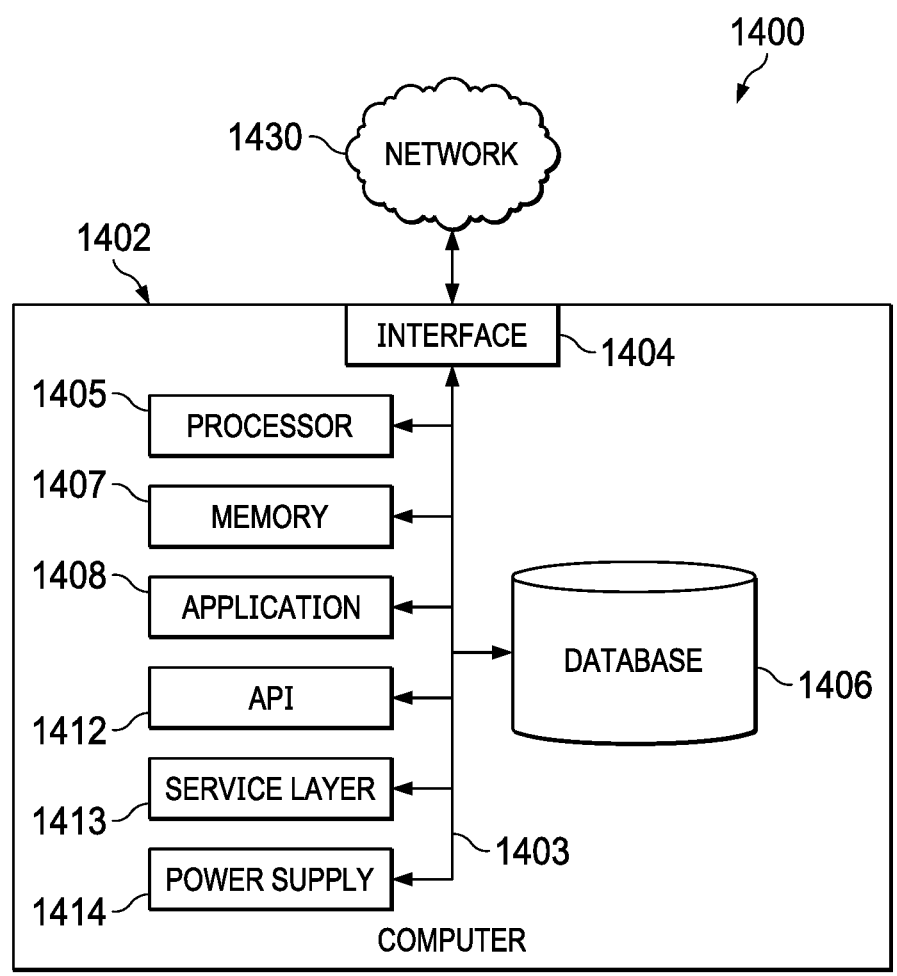
FIG. 14 shows a block diagram of an example computer system for determining a new well path within the scope of the present disclosure.

FIG. 14 is a block diagram of an example computer system 1400 used to provide computational functionalities associated with described algorithms, methods, functions, processes, flows, and procedures described in the present disclosure, according to some implementations of the present disclosure. The illustrated computer 1402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1402 can include input devices such as keypads, keyboards, and touch screens that can accept user information. Also, the computer 1402 can include output devices that can convey information associated with the operation of the computer 1402. The information can include digital data, visual data, audio information, or a combination of information. The information can be presented in a graphical user interface (UI) (or GUI).

The computer 1402 can serve in a role as a client, a network component, a server, a database, a persistency, or components of a computer system for performing the subject matter described in the present disclosure. The illustrated computer 1402 is communicably coupled with a network 1430. In some implementations, one or more components of the computer 1402 can be configured to operate within different environments, including cloud-computing-based environments, local environments, global environments, and combinations of environments.

At a high level, the computer 1402 is an electronic computing device operable to receive, transmit, process, store, and manage data and information associated with the described subject matter. According to some implementations, the computer 1402 can also include, or be communicably coupled with, an application server, an email server, a web server, a caching server, a streaming data server, or a combination of servers.

The computer 1402 can receive requests over network 1430 from a client application (for example, executing on another computer 1402). The computer 1402 can respond to the received requests by processing the received requests using software applications. Requests can also be sent to the computer 1402 from internal users (for example, from a command console), external (or third) parties, automated applications, entities, individuals, systems, and computers.

Each of the components of the computer 1402 can communicate using a system bus 1403. In some implementations, any or all of the components of the computer 1402, including hardware or software components, can interface with each other or the interface 1404 (or a combination of both), over the system bus 1403. Interfaces can use an application programming interface (API) 1412, a service layer 1413, or a combination of the API 1412 and service layer 1413. The API 1412 can include specifications for routines, data structures, and object classes. The API 1412 can be either computer-language independent or dependent. The API 1412 can refer to a complete interface, a single function, or a set of APIs.

The service layer 1413 can provide software services to the computer 1402 and other components (whether illustrated or not) that are communicably coupled to the computer 1402. The functionality of the computer 1402 can be accessible for all service consumers using this service layer. Software services, such as those provided by the service layer 1413, can provide reusable, defined functionalities through a defined interface. For example, the interface can be software written in JAVA, C++, or a language providing data in extensible markup language (XML) format. While illustrated as an integrated component of the computer 1402, in alternative implementations, the API 1412 or the service layer 1413 can be stand-alone components in relation to other components of the computer 1402 and other components communicably coupled to the computer 1402. Moreover, any or all parts of the API 1412 or the service layer 1413 can be implemented as child or sub-modules of another software module, enterprise application, or hardware module without departing from the scope of the present disclosure.

The computer 1402 includes an interface 1404. Although illustrated as a single interface 1404 in FIG. 14, two or more interfaces 1404 can be used according to particular needs, desires, or particular implementations of the computer 1402 and the described functionality. The interface 1404 can be used by the computer 1402 for communicating with other systems that are connected to the network 1430 (whether illustrated or not) in a distributed environment. Generally, the interface 1404 can include, or be implemented using, logic encoded in software or hardware (or a combination of software and hardware) operable to communicate with the network 1430. More specifically, the interface 1404 can include software supporting one or more communication protocols associated with communications. As such, the network 1430 or the interface's hardware can be operable to communicate physical signals within and outside of the illustrated computer 1402.

The computer 1402 includes a processor 1405. Although illustrated as a single processor 1405 in FIG. 14, two or more processors 1405 can be used according to particular needs, desires, or particular implementations of the computer 1402 and the described functionality. Generally, the processor 1405 can execute instructions and can manipulate data to perform the operations of the computer 1402, including operations using algorithms, methods, functions, processes, flows, and procedures as described in the present disclosure.

The computer 1402 also includes a database 1406 that can hold data for the computer 1402 and other components connected to the network 1430 (whether illustrated or not). For example, database 1406 can be an in-memory, conventional, or a database storing data consistent with the present disclosure. In some implementations, database 1406 can be a combination of two or more different database types (for example, hybrid in-memory and conventional databases) according to particular needs, desires, or particular implementations of the computer 1402 and the described functionality. Although illustrated as a single database 1406 in FIG. 14, two or more databases (of the same, different, or combination of types) can be used according to particular needs, desires, or particular implementations of the computer 1402 and the described functionality. While database 1406 is illustrated as an internal component of the computer 1402, in alternative implementations, database 1406 can be external to the computer 1402.

The computer 1402 also includes a memory 1407 that can hold data for the computer 1402 or a combination of components connected to the network 1430 (whether illustrated or not). Memory 1407 can store any data consistent with the present disclosure. In some implementations, memory 1407 can be a combination of two or more different types of memory (for example, a combination of semiconductor and magnetic storage) according to particular needs, desires, or particular implementations of the computer 1402 and the described functionality. Although illustrated as a single memory 1407 in FIG. 14, two or more memories 1407 (of the same, different, or combination of types) can be used according to particular needs, desires, or particular implementations of the computer 1402 and the described functionality. While memory 1407 is illustrated as an internal component of the computer 1402, in alternative implementations, memory 1407 can be external to the computer 1402.

The application 1408 can be an algorithmic software engine providing functionality according to particular needs, desires, or particular implementations of the computer 1402 and the described functionality. For example, application 1408 can serve as one or more components, modules, or applications. Further, although illustrated as a single application 1408, the application 1408 can be implemented as multiple applications 1408 on the computer 1402. In addition, although illustrated as internal to the computer 1402, in alternative implementations, the application 1408 can be external to the computer 1402.

The computer 1402 can also include a power supply 1414. The power supply 1414 can include a rechargeable or non-rechargeable battery that can be configured to be either user- or non-user-replaceable. In some implementations, the power supply 1414 can include power-conversion and management circuits, including recharging, standby, and power management functionalities. In some implementations, the power-supply 1414 can include a power plug to allow the computer 1402 to be plugged into a wall socket or a power source to, for example, power the computer 1402 or recharge a rechargeable battery.

There can be any number of computers 1402 associated with, or external to, a computer system containing computer 1402, with each computer 1402 communicating over network 1430. Further, the terms "client," "user," and other appropriate terminology can be used interchangeably, as appropriate, without departing from the scope of the present disclosure. Moreover, the present disclosure contemplates that many users can use one computer 1402 and one user can use multiple computers 1402.

Described implementations of the subject matter can include one or more features, alone or in combination.

For example, in a first implementation, a computer-implemented method for determining a new well path that intersects a reservoir of the earth, the new well path including an arc and a landing portion, the method including: selecting a length of a first arc portion of the arc that extends from a first point having a first direction vector located along a planned well trajectory and an second point having a second direction vector located along the landing portion, the second point corresponding to an entry point of landing portion, the arc having a change in curvature occurring at a third point located between the first point and the second point; determining, using the Minimum Curvature Method, a length of a second arc portion of the arc; combining the length of the first arc portion and the length of the second arc portion to determine a total length of the arc; connecting first point and the second point with the arc, the arc conforming to the first direction vector at the first point and conforming to the second directional vector at the second point; determining a deviation of the arc from the planned well trajectory; iteratively repeating steps starting from the selecting step to the determining a deviation step; selecting an optimized arc having a length that minimizes deviation from the planned well trajectory; and steering a drilling operation in accordance with the optimized arc to form the new well path.

The foregoing and other described implementations can each, optionally, include one or more of the following features:

A first feature, combinable with any of the following features, the method further including: determining a position of an actual surface of a reservoir of the earth; and establishing the landing portion of the new well path at a position relative to the actual surface of the reservoir when the actual surface is displaced from a predicted surface of the reservoir by a selected amount.

A second feature, combinable with any of the previous or following features, wherein determining a length of the second arc portion of the arc using the Minimum Curvature Method includes solving for $S_{32}$, $\phi_3$, and $\theta_3$ in the following equation:

$$p_2 - p_1 = \frac{S_{13}f(\alpha_{13})}{2}\begin{bmatrix} \sin\theta_1\cos\phi_1 + \sin\theta_3\cos\phi_3 \\ \sin\theta_1\sin\phi_1 + \sin\theta_3\sin\phi_3 \\ \cos\theta_1 + \cos\theta_3 \end{bmatrix} + \frac{S_{32}f(\alpha_{32})}{2}\begin{bmatrix} \sin\theta_3\cos\phi_3 + \sin\theta_2\cos\phi_2 \\ \sin\theta_3\sin\phi_3 + \sin\theta_2\sin\phi_2 \\ \cos\theta_3 + \cos\theta_2 \end{bmatrix},$$

where $p_1$ is the position of the first point; $p_2$ is the position of the second point; $S_{13}$ is the length of the first arc portion of the arc; $S_{32}$ is the length of the second arc portion of the arc; $\phi_1$ is a first direction angle of the direction vector at the first point; $\theta_1$ is a second direction angle of the direction vector at the first point; $\phi_2$ is a first direction angle of the direction vector at the second point; $\theta_2$ is a second direction angle of the direction vector at the second point; $\phi_3$ is a first direction angle of the direction vector at the third point; $\theta_3$ is a second direction angle of the direction vector at the third point; $\alpha_{13}$ is a subtended angle between the direction vector of the first point and a direction vector of the third point; $\alpha_{32}$ is a subtended angle between the direction vector of the third point and the direction vector of the second point; and $f(\alpha)$ is a function represented by $$f(\alpha) = \tan\left(\frac{\alpha}{2}\right)/(\alpha)$$

when a subtended angle between two direction vectors is greater than or equal to 0.02 radians and $f(\alpha)$ is a function represented by $$f(\alpha) \approx 1 + \frac{\alpha^2}{12}\left\{1 + \frac{\alpha^2}{10}\left[1 + \frac{\alpha^2}{168}\left(1 + \frac{31\alpha^2}{18}\right)\right]\right\}$$

when the subtended angle between two direction vectors is less than 0.02 radians.

A third feature, combinable with any of the previous or following features wherein determining a deviation of the arc from the planned well trajectory includes: intersecting the arc and the planned well trajectory with a plurality of parallel planes, each of the parallel planes being offset from each other; and determining, for each plane of the plurality of parallel planes, a deviation between a first point formed by an intersection of the arc with the plane and a second point formed by an intersection of the planned well trajectory and the plane.

A fourth feature, combinable with any of the previous or following features, wherein determining a deviation of the arc from the planned well trajectory includes plotting the arc and the planned well trajectory in three-dimensional space.

A fifth feature, combinable with any of the previous or following features, wherein the plurality of parallel planes includes a first plurality of planes having a first orientation and a second plurality of planes having a second orientation different from the first orientation.

A sixth feature, combinable with any of the previous or following features, wherein combining the length of the first arc portion and the length of the second arc portion to determine a total length of the arc comprises combining $S_{13}$ and $S_{32}$ to produce the total length of the arc.

A seventh feature, combinable with any of the previous or following features, the method further including: commencing a drilling operation according to the planned well trajectory; detecting an actual surface of a reservoir during the drilling operation; and establishing the landing portion of the new well path at a location relative to the actual surface of the reservoir.

An eighth feature, combinable with any of the previous or following features, wherein detecting an actual surface of the reservoir includes collecting data during the drilling operation.

A ninth feature, combinable with any of the previous or following features, wherein collecting data during the drilling operation includes collecting real-time logging-while-drilling data.

A tenth feature, combinable with any of the previous or following features, wherein the landing portion is a portion the new well path within the reservoir, and wherein the entry point is a first point of the landing portion.

An eleventh feature, combinable with any of the previous or following features, wherein the different lengths for the first arc portion are changed according to uniform value.

A twelfth feature, combinable with any of the previous or following features, wherein the different lengths for the first arc portion are changed according to a non-uniform value.

In a second implementation, a non-transitory, computer-readable medium storing one or more instructions executable by a computer system to perform operations for determining a new well path that intersects a reservoir of the earth, the new well path including an arc and a landing portion, the operations including: selecting a length of a first arc portion of the arc that extends from a first point having a first direction vector located along a planned well trajectory and an second point having a second direction vector located along the landing portion, the second point corresponding to an entry point of landing portion, the arc having a change in curvature occurring at a third point located between the first point and the second point; determining, using the Minimum Curvature Method, a length of a second arc portion of the arc; combining the length of the first arc portion and the length of the second arc portion to determine a total length of the arc; connecting first point and the second point with the arc, the arc conforming to the first direction vector at the first point and conforming to the second directional vector at the second point; determining a deviation of the arc from the planned well trajectory; iteratively repeating steps starting from the selecting step to the determining a deviation step; selecting an optimized arc having a length that minimizes deviation from the planned well trajectory; and steering a drilling operation in accordance with the optimized arc to form the new well path.

The foregoing and other described implementations can each, optionally, include one or more of the following features:

A first feature, combinable with any of the following features, the computer-readable medium storing one or more instructions executable by a computer system to perform further operations including determining a position of an actual surface of a reservoir of the earth; and establishing the landing portion of the new well path at a position relative to the actual surface of the reservoir when the actual surface is displaced from a predicted surface of the reservoir by a selected amount.

A second feature, combinable with any of the following features, wherein determining a length of the second arc portion of the arc using the Minimum Curvature Method includes solving for $S_{32}$, $\phi_3$, and $\theta_3$ in the following equation:

$$p_2 - p_1 = \frac{S_{13} f(\alpha_{13})}{2} \begin{bmatrix} \sin\theta_1\cos\phi_1 + \sin\theta_3\cos\phi_3 \\ \sin\theta_1\sin\phi_1 + \sin\theta_3\sin\phi_3 \\ \cos\theta_1 + \cos\theta_3 \end{bmatrix} + \frac{S_{32} f(\alpha_{32})}{2} \begin{bmatrix} \sin\theta_3\cos\phi_3 + \sin\theta_2\cos\phi_2 \\ \sin\theta_3\sin\phi_3 + \sin\theta_2\sin\phi_2 \\ \cos\theta_3 + \cos\theta_2 \end{bmatrix},$$

where $p_1$ is the position of the first point; $p_2$ is the position of the second point; $S_{13}$ is the length of the first arc portion of the arc; $S_{32}$ is the length of the second arc portion of the arc; $\phi_1$ is a first direction angle of the direction vector at the first point; $\theta_1$ is a second direction angle of the direction vector at the first point; $\phi_2$ is a first direction angle of the direction vector at the second point; $\theta_2$ is a second direction angle of the direction vector at the second point; $\phi_3$ is a first direction angle of the direction vector at the third point; $\theta_3$ is a second direction angle of the direction vector at the third point; $\alpha_{13}$ is a subtended angle between the direction vector of the first point and a direction vector of the third point; $\alpha_{32}$ is a subtended angle between the direction vector of the third point and the direction vector of the second point; and $f(\alpha)$ is a function represented by $$f(\alpha) = \tan\left(\frac{\alpha}{2}\right)/(\alpha)$$

when a subtended angle between two direction vectors is greater than or equal to 0.02 radians and $f(\alpha)$ is a function represented by $$f(\alpha) \approx 1 + \frac{\alpha^2}{12}\left\{1 + \frac{\alpha^2}{10}\left[1 + \frac{\alpha^2}{168}\left(1 + \frac{31\alpha^2}{18}\right)\right]\right\}$$

when the subtended angle between two direction vectors is less than 0.02 radians.

A third feature, combinable with any of the following features, wherein determining a deviation of the arc from the planned well trajectory includes: intersecting the arc and the planned well trajectory with a plurality of parallel planes, each of the parallel planes being offset from each other; and determining, for each plane of the plurality of parallel planes, a deviation between a first point formed by an intersection of the arc with the plane and a second point formed by an intersection of the planned well trajectory and the plane.

A fourth feature, combinable with any of the previous or following features, wherein determining a deviation of the arc from the planned well trajectory includes plotting the arc and the planned well trajectory in three-dimensional space.

A fifth feature, combinable with any of the previous or following features, wherein the plurality of parallel planes includes a first plurality of planes having a first orientation and a second plurality of planes having a second orientation different from the first orientation.

A sixth feature, combinable with any of the previous or following features, wherein combining the length of the first arc portion and the length of the second arc portion to determine a total length of the arc comprises combining $S_{13}$ and $S_{32}$ to produce the total length of the arc.

A seventh feature, combinable with any of the previous or following features, the computer-readable medium storing one or more instructions executable by a computer system to perform further operations including: commencing a drilling operation according to the planned well trajectory; detecting an actual surface of a reservoir during the drilling operation; and establishing the landing portion of the new well path at a location relative to the actual surface of the reservoir.

An eighth feature, combinable with any of the previous or following features, wherein detecting an actual surface of the reservoir includes collecting data during the drilling operation.

A ninth feature, combinable with any of the previous or following features, wherein collecting data during the drilling operation includes collecting real-time logging-while-drilling data.

A tenth feature, combinable with any of the previous or following features, wherein the landing portion is a portion the new well path within the reservoir, and wherein the entry point is a first point of the landing portion.

An eleventh feature, combinable with any of the previous or following features, wherein the different lengths for the first arc portion are changed according to uniform value.

A twelfth feature, combinable with any of the previous or following features, wherein the different lengths for the first arc portion are changed according to a non-uniform value.

In a third implementation, a computer-implemented system, comprising one or more processors and a non-transitory computer-readable storage medium coupled to the one or more processors and storing programming instructions for execution by the one or more processors, the programming instructions instructing the one or more processors to perform operations to determine a new well path that intersects a reservoir of the earth, the new well path including an arc and a landing portion, the operations including: selecting a length of a first arc portion of the arc that extends from a first point having a first direction vector located along a planned well trajectory and an second point having a second direction vector located along the landing portion, the second point corresponding to an entry point of landing portion, the arc having a change in curvature occurring at a third point located between the first point and the second point; determining, using the Minimum Curvature Method, a length of a second arc portion of the arc; combining the length of the first arc portion and the length of the second arc portion to determine a total length of the arc; connecting first point and the second point with the arc, the arc conforming to the first direction vector at the first point and conforming to the second directional vector at the second point; determining a deviation of the arc from the planned well trajectory; iteratively repeating steps starting from the selecting step to the determining a deviation step; selecting an optimized arc having a length that minimizes deviation from the planned well trajectory; and steering a drilling operation in accordance with the optimized arc to form the new well path.

The foregoing and other described implementations can each, optionally, include one or more of the following features:

A first feature, combinable with any of the following features, the computer-implemented system further including programming instructions instructing the one or more processors to perform operations including: determining a position of an actual surface of a reservoir of the earth; and establishing the landing portion of the new well path at a position relative to the actual surface of the reservoir when the actual surface is displaced from a predicted surface of the reservoir by a selected amount.

A second feature, combinable with any of the previous or following features, wherein determining a length of the second arc portion of the arc using the Minimum Curvature Method includes solving for $S_{32}$, $\phi_3$, and $\theta_3$ in the following equation:

$$p_2 - p_1 = \frac{S_{13} f(\alpha_{13})}{2} \begin{bmatrix} \sin\theta_1 \cos\phi_1 + \sin\theta_3 \cos\phi_3 \\ \sin\theta_1 \sin\phi_1 + \sin\theta_3 \sin\phi_3 \\ \cos\theta_1 + \cos\theta_3 \end{bmatrix} +$$

$$\frac{S_{32} f(\alpha_{32})}{2} \begin{bmatrix} \sin\theta_3 \cos\phi_3 + \sin\theta_2 \cos\phi_2 \\ \sin\theta_3 \sin\phi_3 + \sin\theta_2 \sin\phi_2 \\ \cos\theta_3 + \cos\theta_2 \end{bmatrix},$$

where $p_1$ is the position of the first point; $p_2$ is the position of the second point; $S_{13}$ is the length of the first arc portion of the arc; $S_{32}$ is the length of the second arc portion of the arc; $\phi_1$ is a first direction angle of the direction vector at the first point; $\theta_1$ is a second direction angle of the direction vector at the first point; $\phi_2$ is a first direction angle of the direction vector at the second point; $\theta_2$ is a second direction angle of the direction vector at the second point; $\phi_3$ is a first direction angle of the direction vector at the third point; $\theta_3$ is a second direction angle of the direction vector at the third point; $\alpha_{13}$ is a subtended angle between the direction vector of the first point and a direction vector of the third point; $\alpha_{32}$ is a subtended angle between the direction vector of the third point and the direction vector of the second point; and $f(\alpha)$ is a function represented by $$f(\alpha) = \tan\left(\frac{\alpha}{2}\right)/(\alpha)$$

when a subtended angle between two direction vectors is greater than or equal to 0.02 radians and $f(\alpha)$ is a function represented by $$f(\alpha) \approx 1 + \frac{\alpha^2}{12}\left\{1 + \frac{\alpha^2}{10}\left[1 + \frac{\alpha^2}{168}\left(1 + \frac{31\alpha^2}{18}\right)\right]\right\}$$

when the subtended angle between two direction vectors is less than 0.02 radians.

A third feature, combinable with any of the previous or following features wherein determining a deviation of the arc from the planned well trajectory includes: intersecting the arc and the planned well trajectory with a plurality of parallel planes, each of the parallel planes being offset from each other; and determining, for each plane of the plurality of parallel planes, a deviation between a first point formed by an intersection of the arc with the plane and a second point formed by an intersection of the planned well trajectory and the plane.

A fourth feature, combinable with any of the previous or following features, wherein determining a deviation of the arc from the planned well trajectory includes plotting the arc and the planned well trajectory in three-dimensional space.

A fifth feature, combinable with any of the previous or following features, wherein the plurality of parallel planes includes a first plurality of planes having a first orientation and a second plurality of planes having a second orientation different from the first orientation.

A sixth feature, combinable with any of the previous or following features, wherein combining the length of the first arc portion and the length of the second arc portion to determine a total length of the arc comprises combining $S_{13}$ and $S_{32}$ to produce the total length of the arc.

A seventh feature, combinable with any of the previous or following features, the computer-implemented system further including programming instructions instructing the one or more processors to perform operations including: commencing a drilling operation according to the planned well trajectory; detecting an actual surface of a reservoir during the drilling operation; and establishing the landing portion of the new well path at a location relative to the actual surface of the reservoir.

An eighth feature, combinable with any of the previous or following features, wherein detecting an actual surface of the reservoir includes collecting data during the drilling operation.

A ninth feature, combinable with any of the previous or following features, wherein collecting data during the drilling operation includes collecting real-time logging-while-drilling data.

A tenth feature, combinable with any of the previous or following features, wherein the landing portion is a portion the new well path within the reservoir, and wherein the entry point is a first point of the landing portion.

An eleventh feature, combinable with any of the previous or following features, wherein the different lengths for the first arc portion are changed according to uniform value.

A twelfth feature, combinable with any of the previous or following features, wherein the different lengths for the first arc portion are changed according to a non-uniform value.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system that includes a computer memory interoperably coupled with a hardware processor configured to perform the computer-implemented method or the instructions stored on the non-transitory, computer-readable medium.

A number of implementations of the present disclosure have been described. Nevertheless, it will be understood that various modifications may be made without departing from the spirit and scope of the present disclosure. For example, the iterative process to determine an optimized arc length may be performed at a defined step-wise interval up to a selected final distance. Accordingly, other embodiments are within the scope of the following claims.

What is claimed is:

1. A method for determining a new well path that intersects a reservoir of the earth, the new well path including an arc and a landing portion, the method comprising:
    selecting a length of a first arc portion of the arc that extends from a first point located along a planned well trajectory, the first point having a first direction vector and a second point located along the landing portion of the new well path wherein the landing portion of the new well path is offset from a second landing portion of the planned well trajectory, the second point having a second direction vector, the second point corresponding to an entry point of landing portion, the arc having a change in curvature occurring at a third point located between the first point and the second point;
    determining, using a minimum curvature method, a length of a second arc portion of the arc;
    combining the length of the first arc potion and the length of the second arc portion to determine a total length of the arc;
    connecting the first point and the second point with the arc, the arc conforming to the first direction vector at the first point and conforming to the second directional vector at the second point;
    determining a deviation of the arc from the planned well trajectory;
    repeating steps of (1) selecting the length of the first arc portion of the arc, (2) determining the length of the second arc portion of the arc, (3) combining the length of the first arc potion and the length of the second arc portion to determine a total length of the arc, (4) connecting the first point and the second point with the arc, and (5) determining a deviation of the arc from the planned well trajectory for a set of first arc portions with different lengths;
    selecting an optimized arc having a length that minimizes deviation from the planned well trajectory; and
    steering a drilling operation in accordance with the optimized arc to form the new well path.

2. The method of claim 1, further comprising:
    determining a position of an actual surface of the reservoir of the earth; and
    establishing the landing portion of the new well path at a position relative to the actual surface of the reservoir when the actual surface is displaced from a predicted surface of the reservoir by a selected amount.

3. The method of claim 1,
    wherein determining a length of the second arc portion of the arc using the minimum curvature method comprises solving for $S_{32}$, $\phi_3$, and $\theta_3$ in the following equation:

$$p_2 - p_1 = \frac{S_{13} f(\alpha_{13})}{2} \begin{bmatrix} \sin\theta_1 \cos\phi_1 + \sin\theta_3 \cos\phi_3 \\ \sin\theta_1 \sin\phi_1 + \sin\theta_3 \sin\phi_3 \\ \cos\theta_1 + \cos\theta_3 \end{bmatrix} + \frac{S_{32} f(\alpha_{32})}{2} \begin{bmatrix} \sin\theta_3 \cos\phi_3 + \sin\theta_2 \cos\phi_2 \\ \sin\theta_3 \sin\phi_3 + \sin\theta_2 \sin\phi_2 \\ \cos\theta_3 + \cos\theta_2 \end{bmatrix},$$

where $p_1$ is the position of the first point;
$p_2$ is the position of the second point;
$S_{13}$ is the length of the first arc portion of the arc;
$S_{32}$ is the length of the second arc portion of the arc;
$\phi_1$ is a first direction angle of the first direction vector at the first point;
$\theta_1$ is a second direction angle of the first direction vector at the first point;
$\phi_2$ is a first direction angle of the second direction vector at the second point;
$\theta_2$ is a second direction angle of the second direction vector at the second point;
$\phi_3$ is a first direction angle of a third direction vector at the third point;
$\theta_3$ is a second direction angle of the third direction vector at the third point;
$\alpha_{13}$ is a subtended angle between the first direction vector of the first point and the third direction vector of the third point;
$\alpha_{32}$ is a subtended angle between the third direction vector of the third point and the second direction vector of the second point; and
$f(\alpha)$ is a function represented by $$f(\alpha) = \tan\left(\frac{\alpha}{2}\right)/(\alpha)$$

when a subtended angle between two direction vectors is greater than or equal to 0.02 radians and
$f(\alpha)$ is a function represented by $$f(\alpha) \approx 1 + \frac{\alpha^2}{12}\left\{1 + \frac{\alpha^2}{10}\left[1 + \frac{\alpha^2}{168}\left(1 + \frac{31\alpha^2}{18}\right)\right]\right\}$$

when the subtended angle between two direction vectors is less than 0.02 radians.

4. The method of claim 3, wherein determining a deviation of the arc from the planned well trajectory comprises:
    intersecting the arc and the planned well trajectory with a plurality of parallel planes, each of the parallel planes being offset from each other; and
    determining, for each plane of the plurality of parallel planes, a deviation between an intersection of the arc with the plane and an intersection of the planned well trajectory and the plane.

5. The method of claim 4, wherein determining a deviation of the arc from the planned well trajectory comprises plotting the arc and the planned well trajectory in three-dimensional space.

6. The method of claim 4, wherein the plurality of parallel planes comprises a first plurality of planes having a first orientation and a second plurality of planes having a second orientation different from the first orientation.

7. The method of claim 4, wherein combining the length of the first arc potion and the length of the second arc portion to determine a total length of the arc comprises combining $S_{13}$ and $S_{32}$ to produce the total length of the arc.

8. The method of claim 1, further comprising:
    commencing the drilling operation according to the planned well trajectory;
    detecting an actual surface of a reservoir during the drilling operation; and
    establishing the landing portion of the new well path at a location relative to the actual surface of the reservoir.

9. The method of claim 8, wherein detecting an actual surface of the reservoir comprises collecting data during the drilling operation.

10. The method of claim 9, wherein collecting data during the drilling operation comprises collecting real-time logging-while-drilling data.

11. The method of claim 1, wherein the landing portion is a portion of the new well path within the reservoir, and wherein the entry point is a first point of the landing portion.

12. A computer program product encoded on a non-transitory medium, the product comprising computer readable instructions for causing one or more processors to perform operations to determine a new well path that intersects a reservoir of the earth, the new well path including an arc and a landing portion, the operations comprising:
selecting a length of a first arc portion of the arc that extends from a first point located along a planned well trajectory, the first point having a first direction vector and a second point located along the landing portion of the new well path wherein the landing portion of the new well path is offset from a second landing portion of the planned well trajectory, the second point having a second direction vector, the second point corresponding to an entry point of landing portion, the arc having a change in curvature occurring at a third point located between the first point and the second point;
determining, using a minimum curvature method, a length of a second arc portion of the arc;
combining the length of the first arc potion and the length of the second arc portion to determine a total length of the arc;
connecting first point and the second point with the arc, the arc conforming to the first direction vector at the first point and conforming to the second directional vector at the second point;
determining a deviation of the arc from the planned well trajectory;
repeating steps of (1) selecting the length of the first arc portion of the arc, (2) determining the length of the second arc portion of the arc, (3) combining the length of the first arc potion and the length of the second arc portion to determine a total length of the arc, (4) connecting the first point and the second point with the arc, and (5) determining a deviation of the arc from the planned well trajectory for a set of first arc portions with different lengths;
selecting an optimized arc having a length that minimizes deviation from the planned well trajectory; and
steering a drilling operation in accordance with the optimized arc to form the new well path.

13. The computer program product of claim 12, the operations further comprising:
determining a position of an actual surface of the reservoir of the earth; and
establishing the landing portion of the new well path at a position relative to the actual surface of the reservoir when the actual surface is displaced from a predicted surface of the reservoir by a selected amount.

14. The computer program product of claim 12, wherein determining a length of the second arc portion of the arc using the minimum curvature method comprises solving for $S_{32}$, $\phi_3$, and $\theta_3$ in the $$p_2 - p_1 = \frac{S_{13} f(\alpha_{13})}{2} \begin{bmatrix} \sin\theta_1\cos\phi_1 + \sin\theta_3\cos\phi_3 \\ \sin\theta_1\sin\phi_1 + \sin\theta_3\sin\phi_3 \\ \cos\theta_1 + \cos\theta_3 \end{bmatrix} +$$

-continued $$\frac{S_{32} f(\alpha_{32})}{2} \begin{bmatrix} \sin\theta_3\cos\phi_3 + \sin\theta_2\cos\phi_2 \\ \sin\theta_3\sin\phi_3 + \sin\theta_2\sin\phi_2 \\ \cos\theta_3 + \cos\theta_2 \end{bmatrix},$$

following equation:
where $p_1$ is the position of the first point;
$p_2$ is the position of the second point;
$S_{13}$ is the length of the first arc portion of the arc;
$S_{32}$ is the length of the second arc portion of the arc;
$\phi_1$ is a first direction angle of the first direction vector at the first point;
$\theta_1$ is a second direction angle of the first direction vector at the first point;
$\phi_2$ is a first direction angle of the second direction vector at the second point;
$\theta_2$ is a second direction angle of the second direction vector at the second point;
$\phi_3$ is a first direction angle of a third direction vector at the third point;
$\theta_3$ is a second direction angle of the third direction vector at the third point;
$\alpha_{13}$ is a subtended angle between the first direction vector of the first point and the third direction vector of the third point;
$\alpha_{32}$ is a subtended angle between the third direction vector of the third point and the second direction vector of the second point; and
$f(\alpha)$ is a function represented by $$f(\alpha) = \tan\left(\frac{\alpha}{2}\right)/(\alpha)$$

when a subtended angle between two direction vectors is greater than or equal to 0.02 radians and
$f(\alpha)$ is a function represented by $$f(\alpha) \approx 1 + \frac{\alpha^2}{12}\left\{1 + \frac{\alpha^2}{10}\left[1 + \frac{\alpha^2}{168}\left(1 + \frac{31\alpha^2}{18}\right)\right]\right\}$$

when the subtended angle between two direction vectors is less than 0.02 radians.

15. The computer program product of claim 14, wherein determining a deviation of the arc from the planned well trajectory comprises:
intersecting the arc and the planned well trajectory with a plurality of parallel planes, each of the parallel planes being offset from each other; and
determining, for each plane of the plurality of parallel planes, a deviation between an intersection of the arc with the plane and an intersection of the planned well trajectory and the plane.

16. The computer program product of claim 14, wherein determining a deviation of the arc from the planned well trajectory comprises plotting the arc and the planned well trajectory in three-dimensional space.

17. The computer program product of claim 14, wherein the plurality of parallel planes comprises a first plurality of planes having a first orientation and a second plurality of planes having a second orientation different from the first orientation.

18. The computer program product of claim 16, wherein combining the length of the first arc potion and the length of the second arc portion to determine a total length of the arc comprises combining $S_{13}$ and $S_{32}$ to produce the total length of the arc.

\* \* \* \* \*